US00RE48495E

(19) United States
(12) Reissued Patent
Fujimoto

(10) Patent Number: US RE48,495 E
(45) **Date of Reissued Patent: *Mar. 30, 2021**

(54) SYSTEM, DEVICE, AND METHOD FOR INITIALIZING A PLURALITY OF ELECTRONIC DEVICES USING A SINGLE PACKET

(71) Applicant: TOSHIBA MEMORY CORPORATION, Minato-ku (JP)

(72) Inventor: Akihisa Fujimoto, Yamato (JP)

(73) Assignee: TOSHIBA MEMORY CORPORATION, Minato (JP)

( * ) Notice: This patent is subject to a terminal disclaimer.

(21) Appl. No.: 16/512,828

(22) Filed: Jul. 16, 2019

Related U.S. Patent Documents

Reissue of:
(64) Patent No.: 9,141,398
Issued: Sep. 22, 2015
Appl. No.: 13/515,891
PCT Filed: Dec. 17, 2010
PCT No.: PCT/JP2010/073469
§ 371 (c)(1),
(2) Date: Jun. 14, 2012
PCT Pub. No.: WO2011/074708
PCT Pub. Date: Jun. 23, 2011

U.S. Applications:
(63) Continuation of application No. 15/464,041, filed on Mar. 20, 2017, now Pat. No. Re. 47,598, which is an application for the reissue of Pat. No. 9,141,398.

(30) Foreign Application Priority Data

Dec. 17, 2009 (JP) ..... 2009-286791
Feb. 2, 2010 (JP) ..... 2010-021569

(51) Int. Cl.
*G06F 15/177* (2006.01)
*G06F 9/00* (2006.01)
(Continued)

(52) U.S. Cl.
CPC ..... *G06F 9/4405* (2013.01); *G06F 1/26* (2013.01); *G06F 1/3287* (2013.01); *G06F 13/00* (2013.01); *G06F 1/266* (2013.01); *Y02D 10/00* (2018.01)

(58) Field of Classification Search
CPC ..... G06F 9/4405; G06F 13/00; G06F 1/3287; G06F 1/26; G06F 1/266; Y02D 10/171
See application file for complete search history.

(56) References Cited

U.S. PATENT DOCUMENTS 4,792,269 A 12/1988 Engle
5,675,794 A 10/1997 Meredith
(Continued)

FOREIGN PATENT DOCUMENTS

CN 1451116 A 10/2003
CN 1457201 A 11/2003
(Continued)

OTHER PUBLICATIONS

Combined Office Action and Search Report dated Jan. 28, 2014 in Taiwanese Patent Application No. 099144561(w/English translation).

(Continued)

*Primary Examiner* — Robert L Nasser
(74) *Attorney, Agent, or Firm* — Oblon, McClelland, Maier & Neustadt, L.L.P.

(57) ABSTRACT

According to one embodiment of the present disclosure, a semiconductor system may be disclosed. The semiconductor system according to the one embodiment may include, for example, a plurality of electronic devices and a host apparatus. The host apparatus may simultaneously initialize the plurality of electronic devices in units of group.

4 Claims, 24 Drawing Sheets

(51) Int. Cl.

| | |
|---|---|
| ***G06F 9/24*** | (2006.01) |
| ***G06F 3/00*** | (2006.01) |
| ***G06F 15/16*** | (2006.01) |
| ***G06F 9/44*** | (2018.01) |
| ***G06F 13/00*** | (2006.01) |
| ***G06F 1/26*** | (2006.01) |
| ***G06F 9/4401*** | (2018.01) |
| ***G06F 1/3287*** | (2019.01) |

(56) References Cited

U.S. PATENT DOCUMENTS

| | | | | |
|---|---|---|---|---|
| 6,018,690 | A * | 1/2000 | Saito et al. | 700/295 |
| 6,226,729 | B1 | 5/2001 | Stevens et al. | |
| 6,233,625 | B1 | 5/2001 | Vander Kamp et al. | |
| 6,301,674 | B1 * | 10/2001 | Saito et al. | 713/340 |
| 6,820,148 | B1 | 11/2004 | Cedar et al. | |
| 7,353,993 | B2 | 4/2008 | Fujimoto | |
| 7,437,576 | B2 * | 10/2008 | Makiyama et al. | 713/300 |
| 7,549,580 | B2 | 6/2009 | Fujimoto | |
| 7,810,727 | B2 | 10/2010 | Fujimoto | |
| 7,891,566 | B2 | 2/2011 | Fujimoto | |
| 8,162,216 | B2 | 4/2012 | Fujimoto | |
| 2003/0018763 | A1 | 1/2003 | Doherty et al. | |
| 2003/0097422 | A1 | 5/2003 | Richards et al. | |
| 2003/0163680 | A1 | 8/2003 | Wang et al. | |
| 2005/0116754 | A1 | 6/2005 | Ichikawa | |
| 2006/0236013 | A1 | 10/2006 | Okeda | |
| 2006/0248328 | A1 * | 11/2006 | Iszlai et al. | 713/2 |
| 2006/0282550 | A1 | 12/2006 | Fujimoto | |
| 2007/0083779 | A1 | 4/2007 | Misaka et al. | |
| 2007/0283139 | A1 | 12/2007 | Kato | |
| 2008/0201548 | A1 | 8/2008 | Przybylski | |
| 2008/0263373 | A1 | 10/2008 | Meier et al. | |
| 2009/0039927 | A1 * | 2/2009 | Gillingham | G11C 7/1093 327/156 |
| 2009/0059943 | A1 | 3/2009 | Nonomura | |
| 2009/0077400 | A1 | 3/2009 | Enami et al. | |
| 2009/0198857 | A1 | 8/2009 | Pyeon | |
| 2010/0174866 | A1 | 7/2010 | Fujimoto et al. | |
| 2013/0067189 | A1 | 3/2013 | Heinrich et al. | |

FOREIGN PATENT DOCUMENTS

| | | | |
|---|---|---|---|
| CN | 1567108 | A | 1/2005 |
| CN | 101377763 | A | 3/2009 |
| CN | 102906717 | A | 1/2013 |
| JP | 8 63408 | | 3/1996 |
| JP | 10 500238 | | 1/1998 |
| JP | 10 333783 | | 12/1998 |
| JP | 2000-078561 | | 3/2000 |
| JP | 2003-158526 | | 5/2003 |
| JP | 2005/18329 | | 1/2005 |
| JP | 2005 157883 | | 6/2005 |
| JP | 2005/284468 | | 10/2005 |
| JP | 2005 316594 | | 11/2005 |
| JP | 2007-148828 | | 6/2007 |
| JP | 2007-200220 | | 8/2007 |
| JP | 2007 299227 | | 11/2007 |
| JP | 2009-070301 | | 4/2009 |
| JP | 2009-123141 | | 6/2009 |
| KR | 10-2005-0048639 | | 5/2005 |
| KR | 10-2009-0047545 | | 5/2009 |
| TW | 200809593 | A | 2/2008 |
| TW | 200839785 | A | 10/2008 |

OTHER PUBLICATIONS

Combined Office Action and Search Report dated Mar. 3, 2014 in in Chinese Patent Application No. 201080053410.2 (w/English translation and English translation of category of cited documents).

International Preliminary Report on Patentability and Written Opinion dated Jun. 28, 2012, in International application No. PCT/JP2010/073469 (English translation only).

Combined Chinese Office Action and Search Report dated Jun. 30, 2017 in Chinese Patent Application No. 20150024061.6 (with English translation of Office Action and English translation of Category of Cited Documents).

Japanese Office Action dated Aug. 19, 2014 in Patent Application No. 2013-212335 (w/English Translation).

Japanese Office Action dated May 21, 2013, in Japan Patent Application No. 2012-527940 (w/English translation).

Office Action dated Aug. 23, 2013 in Korean Application No. 10-2012-7013477 (w/English Translation).

Andrew S. Tanenbaum, "Computer Networks", 1996, Prentice-Hall Inc., third edition, pp. 370.*

International Search Report Issued Mar. 1, 2011 in PCT/JP10/73469 Filed Dec. 17, 2010.

U.S. Appl. No. 13/422,916, filed Mar. 15, 2012, Fujimoto.

U.S. Appl. No. 13/424,482, filed Mar. 20, 2012, Fujimoto.

* cited by examiner

| | Device 4-1 | Device 4-2 | Device 4-3 | Device 4-4 | ··· | Device 4-15 | Host apparatus 2 |
|---|---|---|---|---|---|---|---|
| Operating frequency | f1 | f2 | f3 | f4 | ··· | f15 | f0 |
| Operation timing | T1 | T2 | T3 | T4 | ··· | T15 | T0 |
| ⋮ | ⋮ | ⋮ | ⋮ | ⋮ | ··· | ⋮ | ⋮ |
FIG. 19
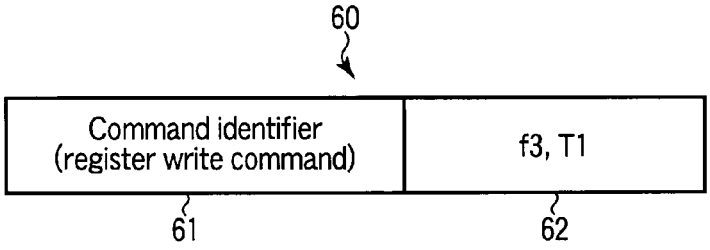
FIG. 20
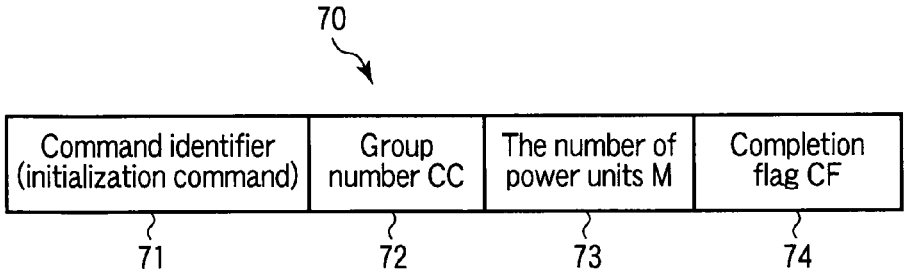
FIG. 21

| VDD2ON | DIDA | Enumeration | Capability setting |
|---|---|---|---|
| 0 | 0 | Executed | Executed |
| 1 | 0 | Executed | Not executed |
| 1 | 1 | Not executed | Not executed |

| Pin Number | Signal |
|---|---|
| Pin 1 | Card detection/data 3 (DAT3) |
| Pin 2 | Command (CMD) |
| Pin 3 | GND |
| Pin 4 | Power supply voltage (VDD1) |
| Pin 5 | Clock (CLK) |
| Pin 6 | GND |
| Pin 7 | Data 0 (DAT0) |
| Pin 8 | Data 1 (DAT1) |
| Pin 9 | Data 2 (DAT2) |
| Pin 10 | Power supply voltage (VDD2)/GND |
| Pin 11 | Data (D1+) |
| Pin 12 | Data (D1-) |
| Pin 13 | Power supply voltage (VDD2)/GND |
| Pin 14 | Power supply voltage (VDD2)/GND |
| Pin 15 | Data (D0-) |
| Pin 16 | Data (D0+) |
| Pin 17 | Power supply voltage (VDD2)/GND |

SYSTEM, DEVICE, AND METHOD FOR INITIALIZING A PLURALITY OF ELECTRONIC DEVICES USING A SINGLE PACKET

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*Notice: More than one reissue application has been filed for the reissue of U.S. Pat. No. 9,141,398. The reissue applications are U.S. application Ser. No. 16/512,828 (the present application), and U.S. application Ser. No. 15/464,041, each of which are reissues of U.S. Pat. No. 9,141,398.*

This application is based upon and claims the benefit of priority from Japanese Patent Applications No. 2009-286791, filed Dec. 17, 2009; and No. 2010-021569, filed Feb. 2, 2010; the entire contents of both of which are incorporated herein by reference.

This application is further a U.S. national phase application under 35 U.S.C. §371 of international application PCT/JP2010/073469 filed Dec. 17, 2010, and the entire contents of which are also incorporated herein by reference.

TECHNICAL FIELD

Embodiments described herein relate generally to a semiconductor system, a semiconductor device, and an electronic device initializing method. For example, the embodiments relate to a semiconductor system including plural electronic devices.

BACKGROUND ART

An SD™ card is well known as a memory system in which a NAND type flash memory is used. An SD interface is well known as an interface between the SD card and a host apparatus. In the SD interface, plural devices can be connected to one bus. For example U.S. Pat. No. 6,820,148 discloses the above-described configuration.

However, in the conventional method, when more devices are controlled by one host apparatus, it takes a long time to initialize the devices.

BRIEF DESCRIPTION OF DRAWINGS

FIG. 19 is a diagram illustrating capability of the electronic device of the first embodiment;

FIG. 20 is a conceptual view of the frame format of the first embodiment;

FIG. 21 is a conceptual view of a frame format according to a second embodiment;

DETAILED DESCRIPTION

In general, according to one embodiment, a semiconductor system includes plural electronic devices and a host apparatus. The host apparatus initializes plural electronic devices in units of group.

First Embodiment

Figure 1:
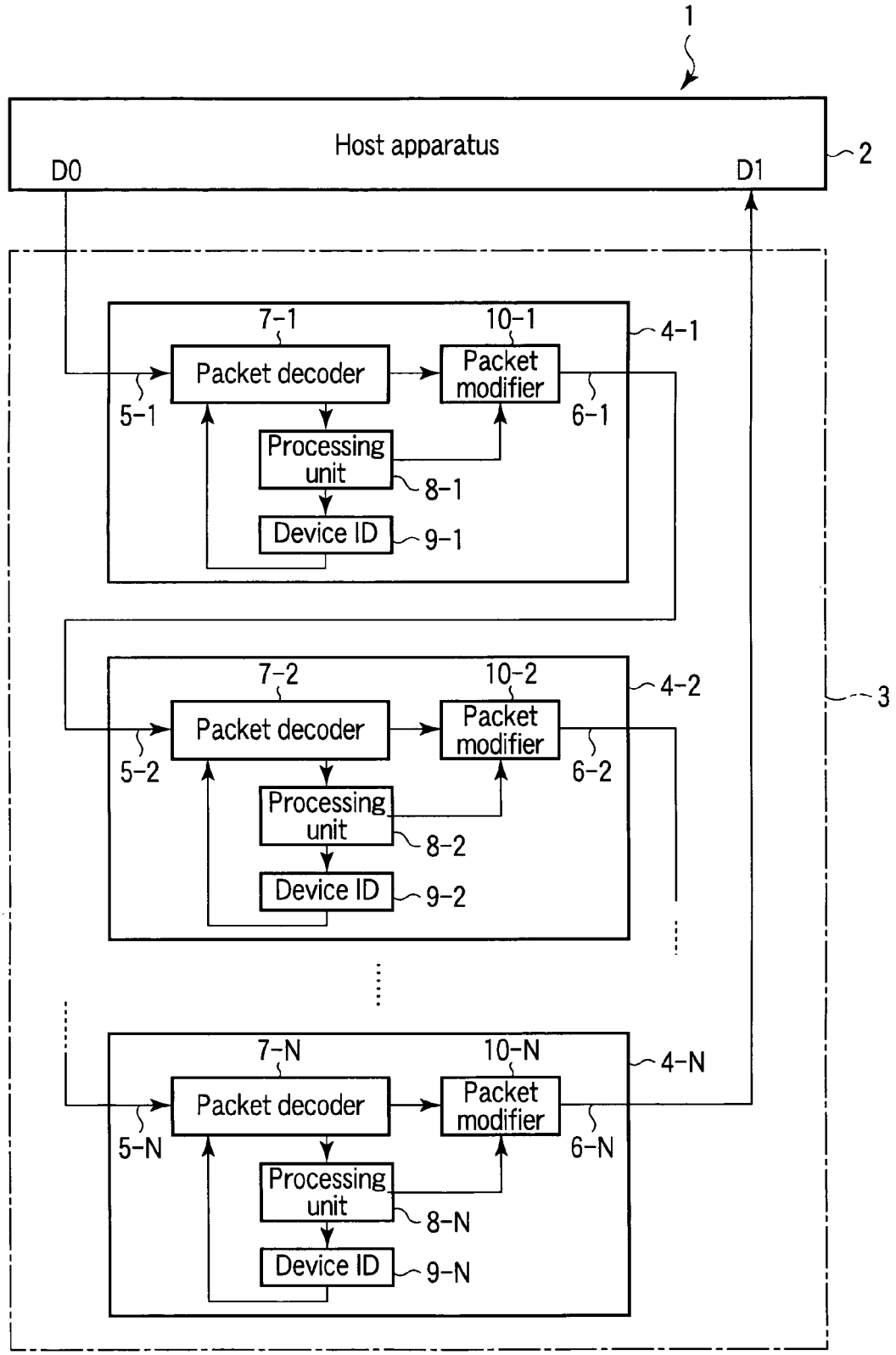
FIG. 1 is a block diagram of a semiconductor system according to a first embodiment.

A semiconductor system and an electronic device initializing method according to a first embodiment will be described below. FIG. 1 is a block diagram illustrating an example of the semiconductor system of the first embodiment.

Configuration of Semiconductor System

Referring to FIG. 1, a semiconductor system 1 includes a host apparatus 2 and a semiconductor devide 3.

The host apparatus 2 includes at least one input port and at least one output port. The host apparatus 2 controls an operation of the semiconductor device 3 through the ports to administer an operation of the semiconductor system 1. For example, each port is configured as a differential pair according to a LVDS (low voltage differential Signaling) method. Hereinafter, a signal output from the output port of the host apparatus 2 is referred to as a signal D0, and differential signals of the signal D0 are referred to as signals D0+ and D0−. A signal input to the output port of the host apparatus 2 is referred to as a signal D1, and differential signals of the signal D1 are referred to as signals D1+ and D1−. The host apparatus 2 assembles a packet including a command and data, and the host apparatus 2 transmits the packet to the semiconductor device 3 to control the operation of the semiconductor device 3. The host apparatus 2 receives the packet transmitted from the semiconductor device 3 to perform the operation according to the received packet.

The semiconductor device 3 includes N (N is a natural number more than 1) electronic devices 4. Hereinafter, the N electronic devices 4 are referred to as electronic devices 4-i (i is 1 to N) when distinguished from one another.

In the first embodiment, each of the electronic devices 4 includes an input signal pin 5, an output signal pin 6, a packet decoder 7, a processing unit 8, a register 9, and a packet update circuit 10. Similarly, when the electronic devices 4-i are distinguished from one another, the units are referred to as an input signal pin 5-i, an output signal pin 6-i, a packet decoder 7-i, a processing unit 8-i, register 9-i, and a packet update circuit 10-i.

The input signal pin 5 including plural signals acts as at least one input port to receive the packet provided from the outside. The input signal pin 5 transfers the received packet to the packet decoder 7.

The packet decoder 7 is configured to be able to analyze the packet transferred from the input signal pin 5. The packet decoder 7 distinguishes kinds of the packets using a command identifier in a packet header. The packet decoder 7 commands the processing unit 8 to perform a necessary calculation in response to the kind of the packet. The packet decoder 7 commands the packet update circuit 10 to update the received packet if needed.

The processing unit 8 is configured to be able to perform necessary processing in response to the command from the packet decoder 7. Examples of the processing contents include initialization of the device and computation of a device ID. On computing the device ID, the processing unit 8 causes the register 9 to retain the device ID. The device ID means a number that is unique to each electronic device 4, and the host apparatus can identify each electronic device 4 using the device ID. When the received packet is not broadcast (for example, unicast or multicast), the packet decoder 7 compares the device ID that is included as address information in the packet with the device ID in the register 9, which allows the packet decoder 7 to determine whether the packet is direct to the semiconductor device 3.

The packet update circuit 10 updates contents of a payload of the received packet, and the packet update circuit 10 outputs the packet to the outside from the output signal pin 6 that includes the plural signals to act as at least one output port. For example, the packet update circuit 10 updates the contents of the payload according to calculation result of the processing unit 8. There are two kinds of timing in which the packet is output from the output signal pin 6, that is, the case in which the received packet is transmitted as soon as possible irrespective of a processing status of the device to the received packet, and the case in which the packet is transmitted after the device performs the processing to the received packet. It depends on the command identifier of the packet and a state of the device.

The N electronic devices 4-1 to 4-N having the above-described configuration are ring-connected (or chain-connected) to the host apparatus 2 as illustrated in FIG. 1. That is, the packet transmitted from the host apparatus 2 is received by the electronic device 4-1, transferred from the electronic device 4-1 to the electronic device 4-2, and transferred from the electronic device 4-2 to the electronic device 4-3. After that, similar steps are repeated. Then the packet output from the output signal pin 6-N of the electronic device 4-N is returned to the host apparatus 2. The semiconductor device 3 of FIG. 1 includes a configuration in which the semiconductor device 3 includes electronic devices 4-1 to 4-N and a hub (see a fourth embodiment). Almost all the pieces of communication conducted using the ring connection are used in the communication between the host and the electronic device and occasionally used in the communication between the electronic devices. For example, when the electronic device 4-2 does not correctly receive data, which is transmitted from electronic device 4-1 to the electronic device 4-2, due to a noise, the electronic device 4-2 can make a request to transmit the data again. At this point, the electronic device 4-1 is notifies of the retransmission request made by the electronic device 4-2 through the electronic devices 4-3 to 4-N and the host apparatus 2, which allows the electronic device 4-1 to retransmit the data.

Operation of Semiconductor System 1

Figure 2:
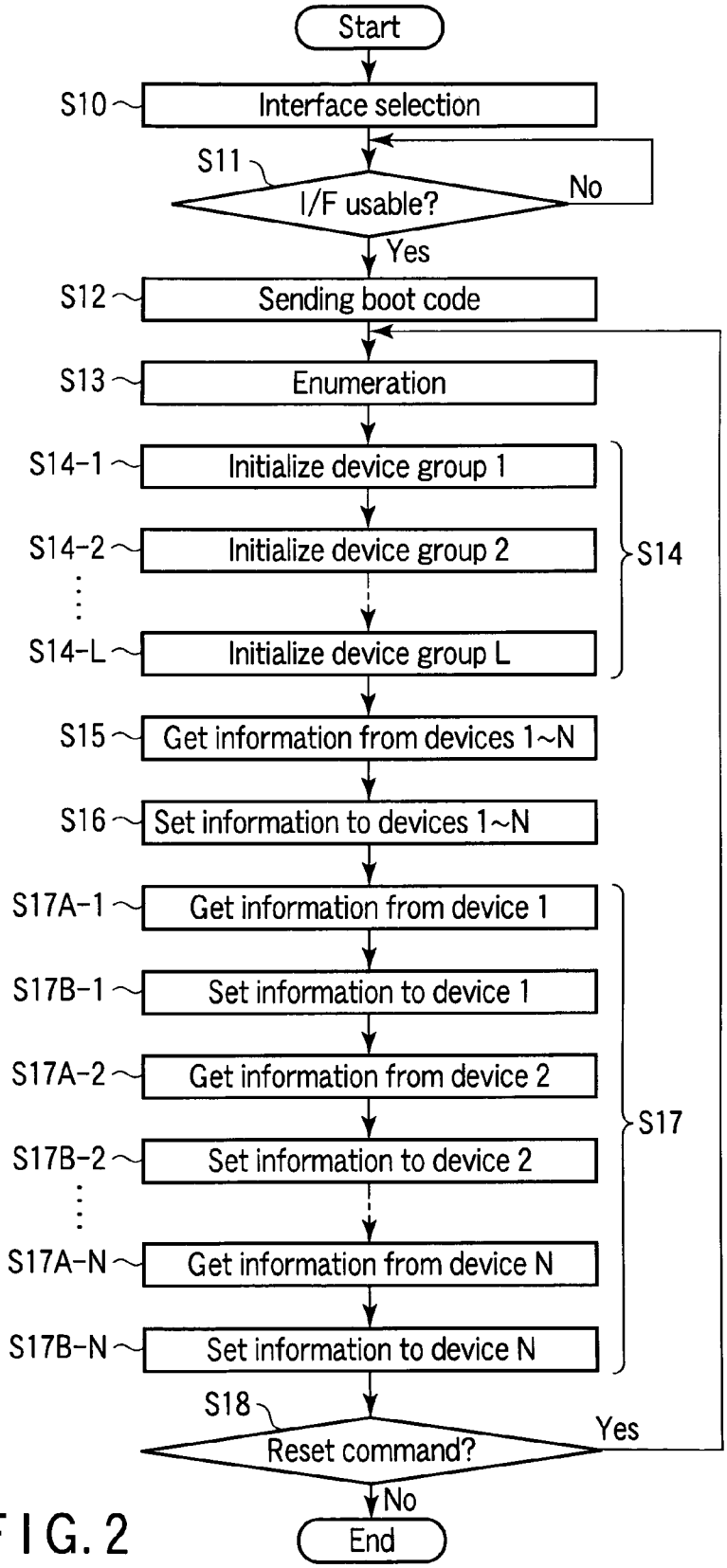
FIG. 2 is a flowchart illustrating an operation of the semiconductor system of the first embodiment.

An operation of the semiconductor system 1 having the above-described configuration in connecting the semiconductor device 3 to the host apparatus 2 will be described below with reference to FIG. 2. FIG. 2 is a flowchart illustrating an operation of the semiconductor system. First an entire flow will roughly be described.

As illustrated in FIG. 2, interface selection is performed (Step S10). In Step S10, the host apparatus 2 determines whether an interface connected to the semiconductor device 3 can be used, that is, whether the semiconductor device 3 is connected. When the interface can be used, that is, when the semiconductor device 3 is connected (YES in Step S11), one of the electronic devices 4 transmits a boot code to the host apparatus 2 (Step S12). The host apparatus 2 that receives the boot code performs the boot code and performs numbering of the electronic devices 4 (enumeration) (Step S13). That is, the device ID described above is allocated to each electronic device 4.

After the allocation of the device ID, each electronic device 4 is initialized in response to the command from the host apparatus 2 (Step S14). Each electronic device 4 becomes a ready state by the initialization. The initialization is performed in units of a plurality of the electronic devices 4 in order to shorten a time necessary for the initialization. However, when the host apparatus 2 has a restriction to a power supply current that can be supplied to the electronic device 4, the number of simultaneously-initialized devices is restricted, and thus the initialization is separately performed.

Then, the host apparatus 2 obtains information on each electronic device 4 (Step S15). After Step S15, the host apparatus 2 determines an operating condition common to the electronic devices 4 based on the capabilities of the host apparatus 2 and electronic device 4, and the host apparatus 2 collectively sets the operating condition for the host apparatus 2 and the electronic devices 4 (Step S16). The capability set in this step is an item common to the whole system. Then the host apparatus 2 determines an individual operating condition of the electronic device 4, and the host apparatus 2 separately sets the individual operating condition for the electronic device 4 (Step S17).

A UHS-II card has a hierarchical structure. Therefore, when the semiconductor device 3 is the UHS-II card, the initialization is performed to a physical layer in Step S14. For example, the initialization is performed to a layer higher than the physical layer in Step S16 and Step S17B.

Each step will sequentially be described in detail.

Step S10

Figure 3:
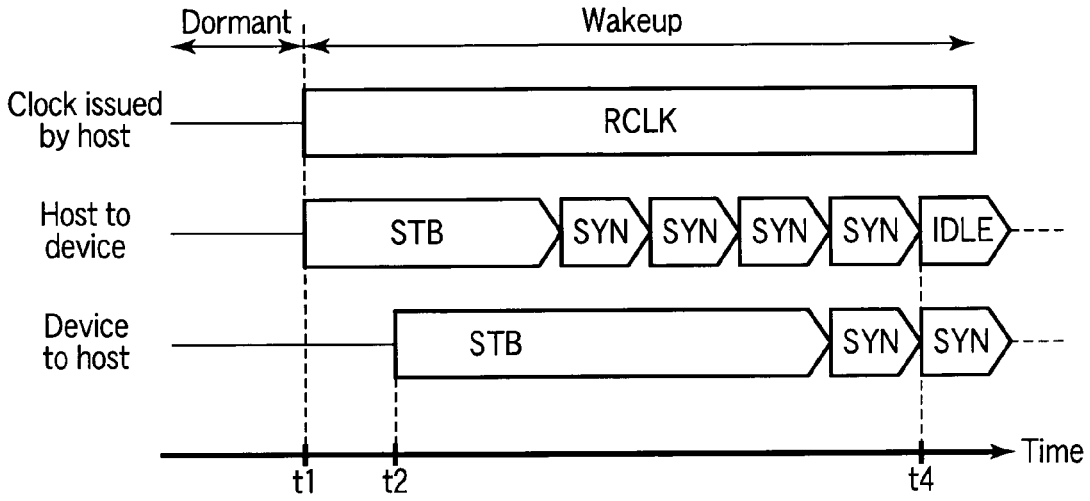
FIG. 3 and FIG. 4 are timing charts of a symbol and a signal of the first embodiment.
Figure 4:
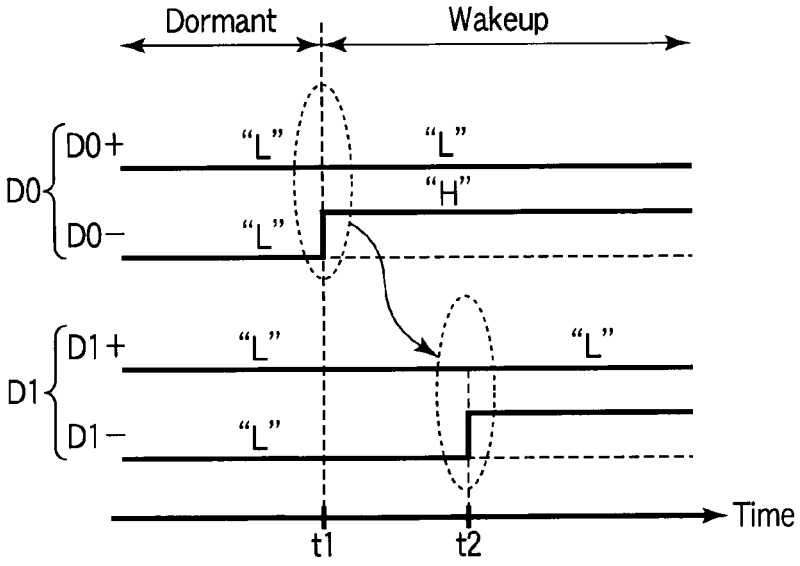

Step S10 will be described with reference to FIG. 3 and FIG. 4. FIG. 3 is a timing chart illustrating a clock and a symbol, transmitted from the host apparatus 2 to the semiconductor device 3 and a level and a symbol (the state is communicated in synchronization with the clock in the symbol, and the symbol includes plural bits and is encoded by 8b/10b coding), transmitted from the semiconductor device 3 to the host apparatus 2, immediately after the semiconductor device 3 is connected to the host apparatus 2. FIG. 4 is a timing chart of the signals D0 and D1 immediately after the semiconductor device 3 is connected to the host apparatus 2.

As illustrated in FIG. 3 and FIG. 4, before a time t1, the semiconductor system 1 is in a power-down state. In the power-down state, the host apparatus 2 does not generate the clock, and the host apparatus 2 does not transmit the symbol to the semiconductor device 3. The semiconductor device 3 does not transmit the symbol to the semiconductor device 3. Accordingly, either a level D0+=D0−=D1+=D1−="H" or a level D0+=D0−=D1+=D1−="L" can be taken before the time t1. FIG. 4 illustrates the level D0+=D0−=D1+=D1−="L".

Then, at the time t1, the host apparatus 2 transmits STB to the semiconductor device 3 using one of an "H" level or an "L" level of the differential signal in order to determine usability of the interface. At this point, it is assumed that the "H" level is STB. Therefore, a data link state transitions to a wakeup state. The host apparatus 2 outputs a clock RCLK to the semiconductor device 3. The clock RCLK is supplied to each of the electronic devices 4-0 to 4-n. Hereinafter the electronic device 4 performs the operation in synchronization with the clock RCLK. The level STB is sequentially transferred from the electronic device 4-0 to the electronic device 4-N. At a time t2, the electronic device 4 that receives the level STB returns the level STB to the host apparatus 2. The level STB is a signal that indicates that the host apparatus 2 and the electronic device 4 are in a standby state before synchronized with each other.

The host apparatus 2 transmits the level STB, whereby the D0− changes from the "L" level to the "H" level while the signal D0 changes to the differential level. The semiconductor device 3 transmits the level STB, whereby the D1− changes from the "L" level to the "H" level while the signal D0 changes to the differential level. Thus, the host apparatus 2 recognizes that the interface can be used by detecting that the signals D0 and D1 change to the differential level.

Then processing is performed in order to synchronize the host apparatus 2 and the semiconductor device 3 with each other. That is, the host apparatus 2 transmits a symbol SYN to the semiconductor device 3, and the semiconductor device 3 returns the symbol SYN to the host apparatus 2 when a PLL is locked. When the PLL is locked with respect to all the semiconductor devices 3, the host apparatus 2 receives the symbol SYN. Because the reception clock of the host apparatus 2 differs from the transmission clock RCLK in a phase, it is necessary to lock another PLL for the reception. The symbol SYN is one that is used for synchronization. The PLL is locked while the symbol SYN is received plural times, which allows synchronous communication to be conducted between the host apparatus 2 and the semiconductor device 3.

Figure 5:
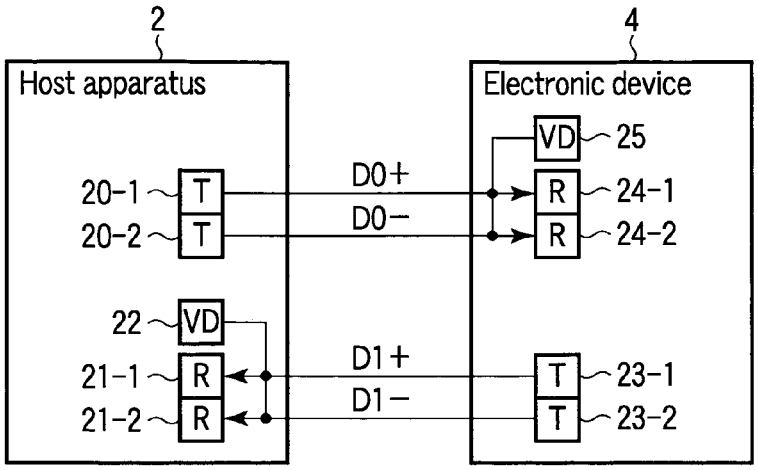
FIG. 5 is a block diagram of the semiconductor system of the first embodiment.

FIG. 5 is a block diagram of the host apparatus 2 and any one of the electronic devices 4, particularly illustrates a configuration relating to data link. As illustrated in FIG. 5, the host apparatus 2 includes transmission I/Os 20-1 and 20-2 that transmit the signals D0+ and D0−, reception I/Os 21-1 and 21-2 that receive the differential signals D1+ and D1−, and a voltage level detection circuit 22. The voltage level detection circuit 22 detects a level change of the differential signal D1+ and D1−. A determination that the interface with the electronic device 4 can be used is made when the voltage level detection circuit 22 detects the change in signal level.

The electronic device 4 includes transmission I/Os 23-1 and 23-2 that transmit the differential signals D1+ and D1−, reception I/O 24-1 and 24-2 that receive the differential signals D0+ and D0−, and a voltage level detection circuit 25. The voltage level detection circuit 25 detects a level change of the differential signal D0+ and D0−. For example, when the host apparatus 2 is started up from the electronic device 4, the voltage level detection circuit 25 detects the change in signal level, which allows the host apparatus 2 to be started up.

Step S12

Step S12 of FIG. 2 will be described below. In the semiconductor device 3, any one of the electronic devices 4 is a memory device that retains the boot code. At this point, only by way of example, it is assumed that the electronic device 4-N is the memory device that retains the boot code. The boot code means a program code that is necessary to start up the system in the host apparatus 2. The boot code is transferred to a system memory of the host apparatus 2, and the boot code is executed by the host apparatus 2. A device driver and an OS (Operating System) are loaded on the system memory by a boot loader included in the boot code.

The electronic device 4-N receives the symbol STB from the host apparatus 2 and returns the symbol STB to the host apparatus 2. Then, the electronic device 4-N voluntarily reads the boot code without receiving the command from the host apparatus 2, and the electronic device 4-N transmits the boot code to the host apparatus 2.

Figure 6:
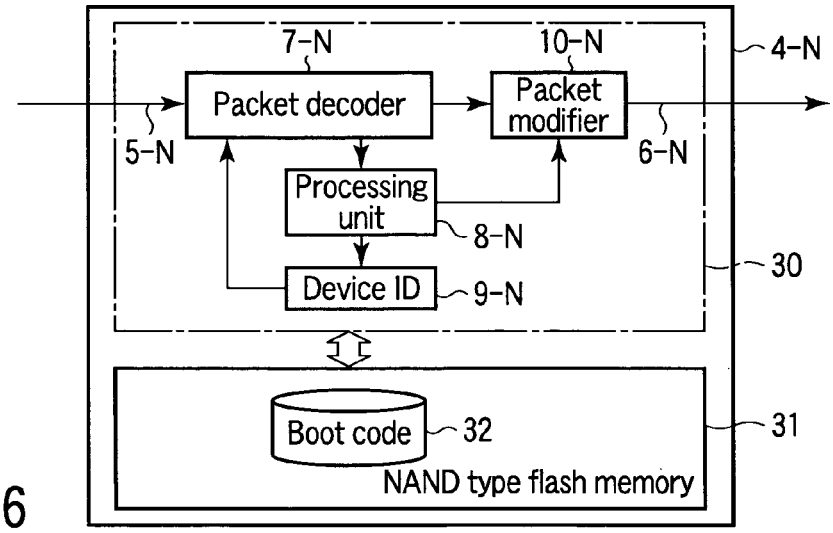
FIG. 6 is a block diagram of an electronic device of the first embodiment.

FIG. 6 is a block diagram of the electronic device 4-N, and FIG. 6 illustrates the detailed configuration of the electronic device 4-N rather than that of FIG. 1. As illustrated in FIG. 6, the electronic device 4-N includes a memory controller 30 and a NAND type flash memory 31. The memory controller 30 includes a packet decoder 7-N, a processing unit 8-N, register 9-N, and a packet update circuit 10-N. The NAND type flash memory 31 retains a boot code 32. After transmitting the level STB to the host apparatus 2, the processing unit 8-N reads the boot code 32 from the NAND type flash memory 31. The processing unit 8-N assembles the boot code 32 as the packet and transmits the packet from the output signal pin 6 to the host apparatus 2.

Figure 7:
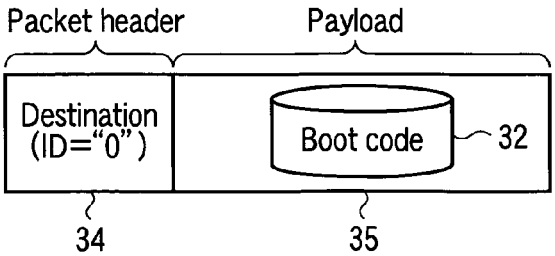
FIG. 7 and FIG. 8 are conceptual views of a frame format of the first embodiment.

FIG. 7 is a schematic diagram illustrating a configuration of the packet. As illustrated in FIG. 7, the packet 33 includes a packet header 34 and a payload 35. The payload 35 includes the boot code 32 that is read from the NAND type flash memory 31. The packet header 34 includes a destination of the packet. The destination is indicated as an ID, and ID="0" is stored when the destination is host apparatus 2. Although a device ID of a boot device is not determined yet when the boot code is transmitted before the enumeration, for example, device ID=1 of the transmission source is tentatively allocated to the device ID of the boot device. A size of the boot code may be set as a preset value to the host and the boot device, or a region indicating the size of the boot code may be secured in the packet header or a specific portion of the boot code.

The electronic device except the electronic device 4-N may be used as the electronic device including the boot code. For example, the electronic device 4-(N−1) may be used as the electronic device including the boot code. In this case, at first the electronic device 4-(N−1) transmits the packet 33 to the electronic device 4-N. Because the destination of the packet 33 is the host apparatus 2, the electronic device 4-N transmits the packet 33 to the host apparatus 2 without change.

Step S13

Figure 8:
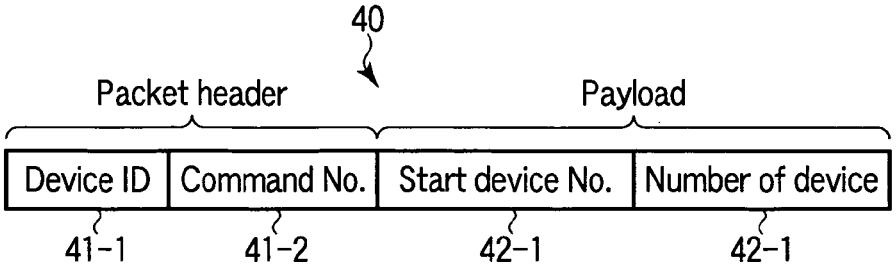

Step S13 of FIG. 2 will be described below. In Step S13, the host apparatus 2 provides the device IDs to the electronic devices 4-0 to 4-N included in the semiconductor device 3. For example, a method disclosed in Japanese Patent Application No. 2009-221468 can be adopted in Step S13. FIG. 8 is a schematic diagram of the packet issued by the host apparatus 2 in performing Step S13.

As illustrated in FIG. 8, a packet header of a packet 40 includes at least fields 41-1 and 41-2. The device ID that indicates the destination of the packet 40 is stored in the field 41-1. A command identifier corresponding to a command to provide the device ID is stored in the field 41-2. A payload includes at least fields 42-1 and 42-2. The field 42-1 indicates a start device ID (start device number), and a value of the field 42-1 is determined by the electronic device 4-1 that initially receives the packet 40 from the host apparatus 2. The number of electronic devices 4 to which the setting of the device ID is completed is stored in the field 42-2. The value of the field 42-1 is incremented in a process of transferring the packet among the electronic devices 4, which allows the host apparatus 2 to recognize the total number of electronic devices 4. The host apparatus 2 can specify the device ID of each electronic device 4 from the values of the fields 42-1 and 42-2. A final device ID (final device number) may be indicated in the field 42-2 instead of the number of electronic devices 4 to which the setting of the device ID is completed, because the number of devices can be computed by subtraction when the final device number and the initial device number are found.

Figure 9:
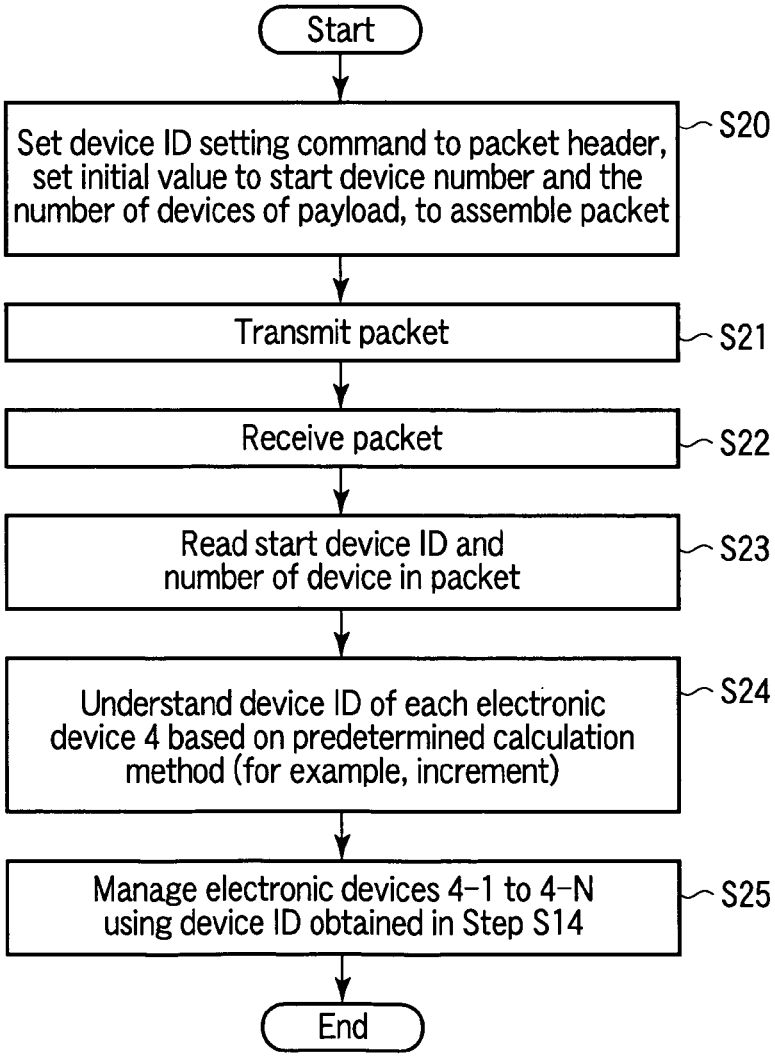
FIG. 9 and FIG. 10 are flowcharts illustrating operations of a host apparatus and the electronic device of the first embodiment.

FIG. 9 is a flowchart illustrating the operation of the host apparatus 2 in providing the device ID. As illustrated in FIG. 9, the host apparatus 2 assembles the packet in order to specify the device ID (Step S20). That is, the command identifier (field 41-2) corresponding to the command (hereinafter referred to as ID providing command) to specify the device ID is set to the packet header, and initial values (in the first embodiment, zero) are set to the values of the start device ID (field 42-1) and the number of devices (field 42-2) of the payload.

The host apparatus 2 transmits the packet assembled in Step S20 to the semiconductor device 3 (Step S21). Whether the packet is transmitted in the form of the broadcast (multicast) or unicast is previously made in each command. The ID providing command is a broadcast command. Accordingly, the destination in the field 41-1 of the packet header is ignored, and the packet is transmitted to the initial electronic device 4-1 of the ring connection in the case of the connection relationship in FIG. 1.

Then the host apparatus 2 receives the packet from the final electronic device 4-N of the ring connection (Step S22). Therefore, the host apparatus 2 reads the initial device ID (field 42-1) and the number of devices (field 42-2) in the received packet (Step S23). The value of the field 42-1 is the device ID of the initial electronic device 4-1 of the ring connection, and the value of the field 42-2 is the number N of ring-connected electronic devices 4-1 to 4-N.

The host apparatus 2 performs predetermined calculation using the values of the fields 42-1 and 42-2 to recognize the device ID and the total number of devices of the electronic devices 4-2 to 4-N (Step S24). The number of identifiable devices is determined by the number of bits of the device ID field. The predetermined calculation means a rule in which the electronic devices 4-2 to 4-N compute the IDs thereof with respect to the start device ID. For example, predetermined calculation means that the increment is performed by the number of devices. Accordingly, for example, the start device ID has a value "n (n is a natural number)" in the packet received from the electronic device 4-N, it is found that the electronic device 4-1 has the device ID "n", the electronic device 4-2 has the device ID "n+1", and the electronic device 4-N has the device ID "n+N".

The host apparatus 2 manages the electronic devices 4-1 to 4-3 using the device IDs obtained in Step S24.

Figure 10:
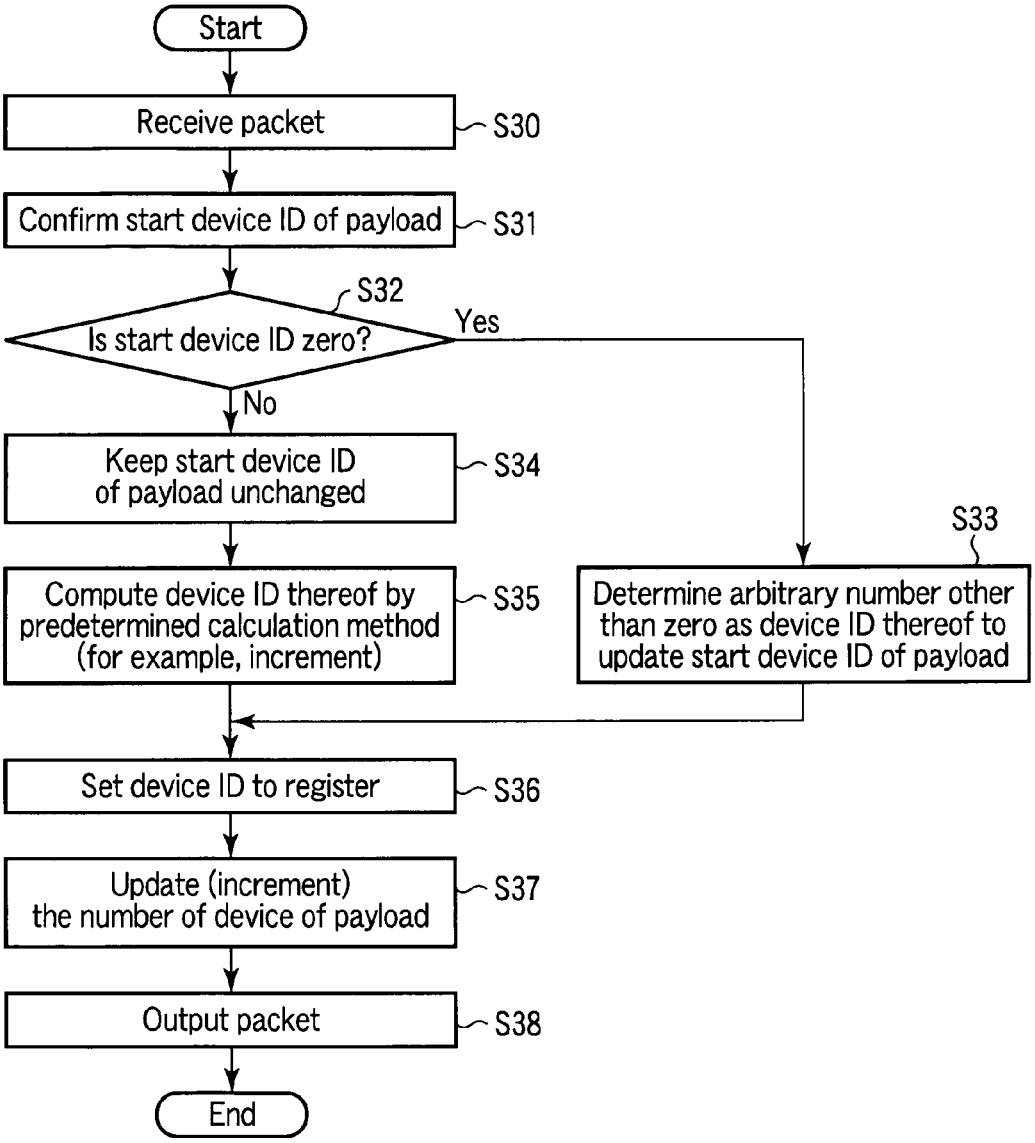

An operation of the electronic device 4 will be described below with reference to FIG. 10. FIG. 10 is a flowchart illustrating the operation of the electronic device 4 in receiving the packet including the ID providing command, and the flowchart of FIG. 10 is common to the electronic devices 4-1 to 4-N.

As illustrated in FIG. 10, the electronic device 4 receives the packet at the input signal pin 5 (Step S30). When recognizing that the received packet includes the ID providing command from the command number of the field 41-2 of the packet, the packet decoder 7 commands the processing unit 8 to compute the device ID thereof.

In response to the command, the processing unit 8 confirms whether the value (start device ID) of the field 42-1 of the received packet is a predetermined value (in the first embodiment, zero) set by the host apparatus 2 (Step S31). When the value of the field 42-1 is zero (YES in Step S32), the processing unit 8 determines any number except zero as the device ID thereof, and the processing unit 8 commands the packet update circuit 10 to update the value (start device ID) of the field 42-1 to the determined device ID. Therefore, the packet update circuit 10 updates the field 42-1. The reason for using the number other than zero is that zero has been already allocated to the device ID of the host apparatus 2.

On the other hand, when the value of the field 42-1 is not the predetermined value set by the host apparatus 2 (NO in Step S32), the value of the field 42-1 is maintained (Step S34). That is, the processing unit 8 does not command the packet update circuit 10 to update the value of the field 42-1. The processing unit 8 performs the predetermined calculation using the field 42-1 to compute the device ID thereof (Step S35). The calculation in Step S35 is identical to the calculation in Step S24 of FIG. 9. For example, the calculation in Step S35 means that the field 42-1 (start device ID) is incremented by the number of times corresponding to the field 42-2 (the number of devices).

Then the processing unit 8 stores the device ID thereof determined in Step S33 or S35 in the register 9 (Step S36).

In response to the command from the packet decoder 7 or processing unit 8, the packet update circuit 10 updates (increments) the value of the field 42-2 of the received packet. The packet update circuit 10 outputs the packet in which the field 42-2 or both the fields 42-1 and 42-2 are updated.

Figure 11:
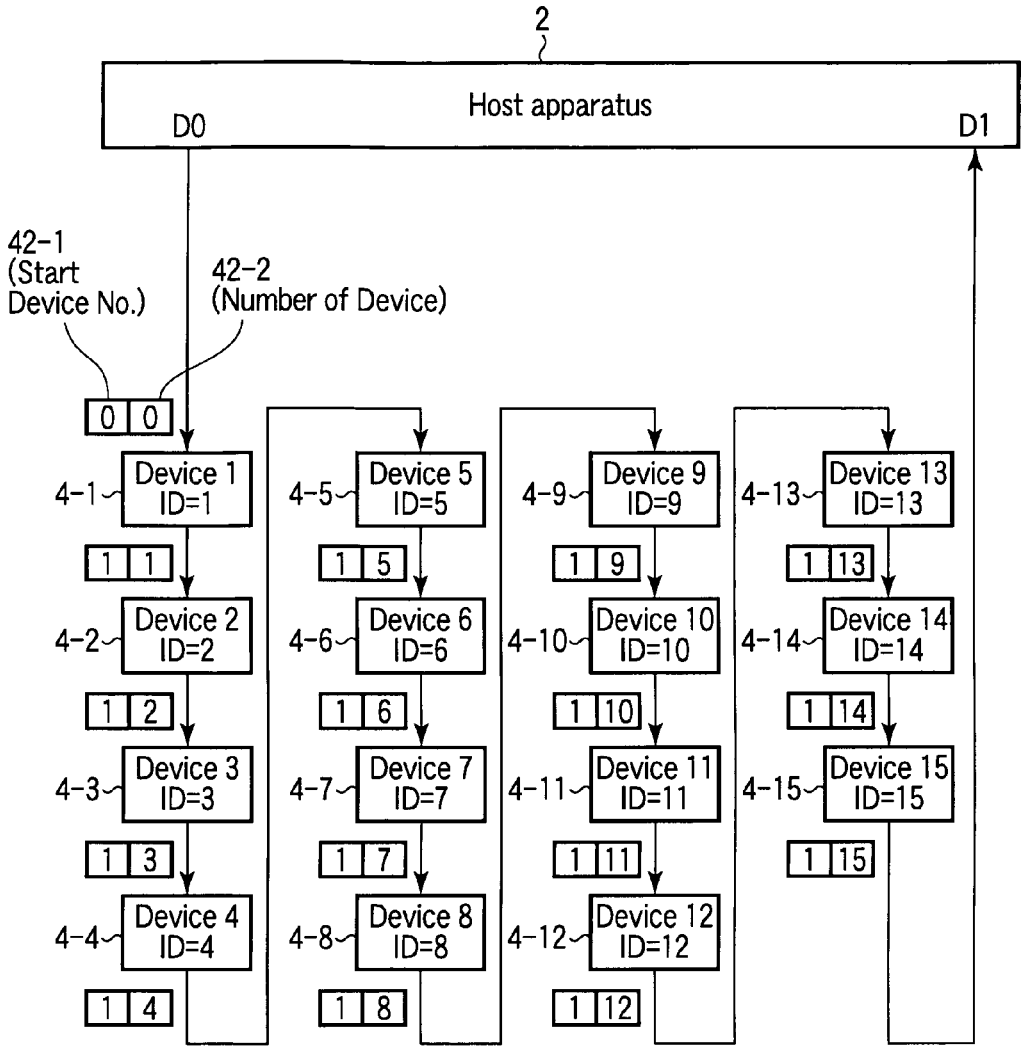
FIG. 11 is a block diagram of the semiconductor system of the first embodiment.

A specific example in Step S13 will be described with reference to FIG. 11. FIG. 11 is a block diagram of the semiconductor system 1, and FIG. 11 illustrates the case in which the 15 (N=15) electronic devices 4 are provided in the semiconductor device 3 by way of example. In FIG. 11, square marks added to a side of an arrow between the devices indicate payload contents of the packet, the left side of the square marks indicates the field 42-1 (start device ID), and the right side indicates the field 42-2 (the number of devices).

As illustrated in FIG. 11, at first the packet including the ID providing command is broadcasted from the host apparatus 2. At this point, the values of the fields 42-1 and 42-2 of the packet are the predetermined value (zero) set by the host apparatus 2 (Steps S20 and S21 of FIG. 9). The packet is initially received by the electronic device 4-1.

In the electronic device 4-1, because the field 42-1 has the value "0" (YES in Step S32 of FIG. 10), any number is determined as the device ID of the device 4-1. In the example illustrated in FIG. 11, the device ID is the number "1". The field 42-1 is updated from "0" to "1" (Step S33 of FIG. 10), the value of the field 42-2 is incremented and updated from "0" to "1" (Step S37 of FIG. 10), and the updated value of the field 42-2 is output by the device 4-1.

The packet output from the electronic device 4-1 is received by the electronic device 4-2. In the electronic device 4-2, because the field 42-1 does not have the value "0" (NO in Step S32 of FIG. 10), the device ID of the device 4-2 is computed by the predetermined calculation method (Step S35 of FIG. 10). That is, the value of the field 42-1 is incremented by the value of the field 42-2 to determine the device ID of the electronic device 4-2 as "1"+"1"="2". While the value of the field 42-1 is maintained (Step S34 of FIG. 10), the value of the field 42-2 is incremented and updated from "1" to "2" (Step S37 of FIG. 10), and the updated value of the field 42-2 is output by the device 4-2.

Similarly, the device ID is allocated to the electronic device 4. That is, the device IDs "3" to "15" are allocated to the electronic devices 4-3 to 4-15.

The packet output from the electronic device 4-15 is received by the host apparatus 2. In the packet, the field 42-1 has the value "1" and the field 42-2 has the value "15". Accordingly, the host apparatus can recognize that the electronic device 4-1 has the device ID "1" and the total number of electronic devices 4 is "15" (Step S23 of FIG. 9). Therefore, the host apparatus 2 understands that the electronic devices 4-1 to 4-15 have the device IDs "1" to "15", respectively.

Step S14

Figure 12:
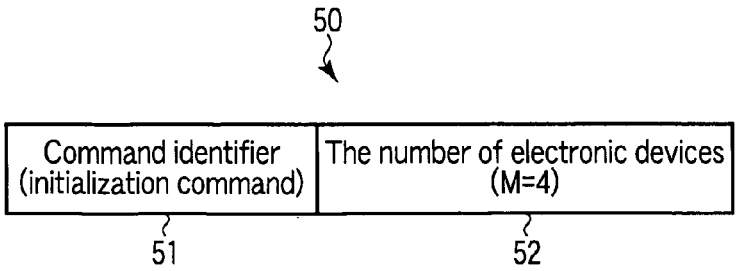
FIG. 12 is a conceptual view of the frame format of the first embodiment.

Step S14 of FIG. 2 will be described below. In Step S14, the host apparatus 2 initializes the electronic devices 4-0 to 4-N included in the semiconductor device 3. FIG. 12 is a schematic diagram of a packet issued by the host apparatus 2 in performing the initialization.

As illustrated in FIG. 12, a command identifier indicating an initialization command is included in a packet header 51 of a packet 50, and the maximum number of electronic devices M that can be initialized once by the host apparatus 2 is included in a payload 52. The initialization command is issued as the broadcast command. Whether the initialization command is the broadcast command may be determined by the command identifier. Alternatively, the broadcast command may be defined by setting transmission source ID=transmission destination ID="0". This means that the host apparatus 2 transmits the packet and the host apparatus 2 finally receives the packet.

Figure 13:
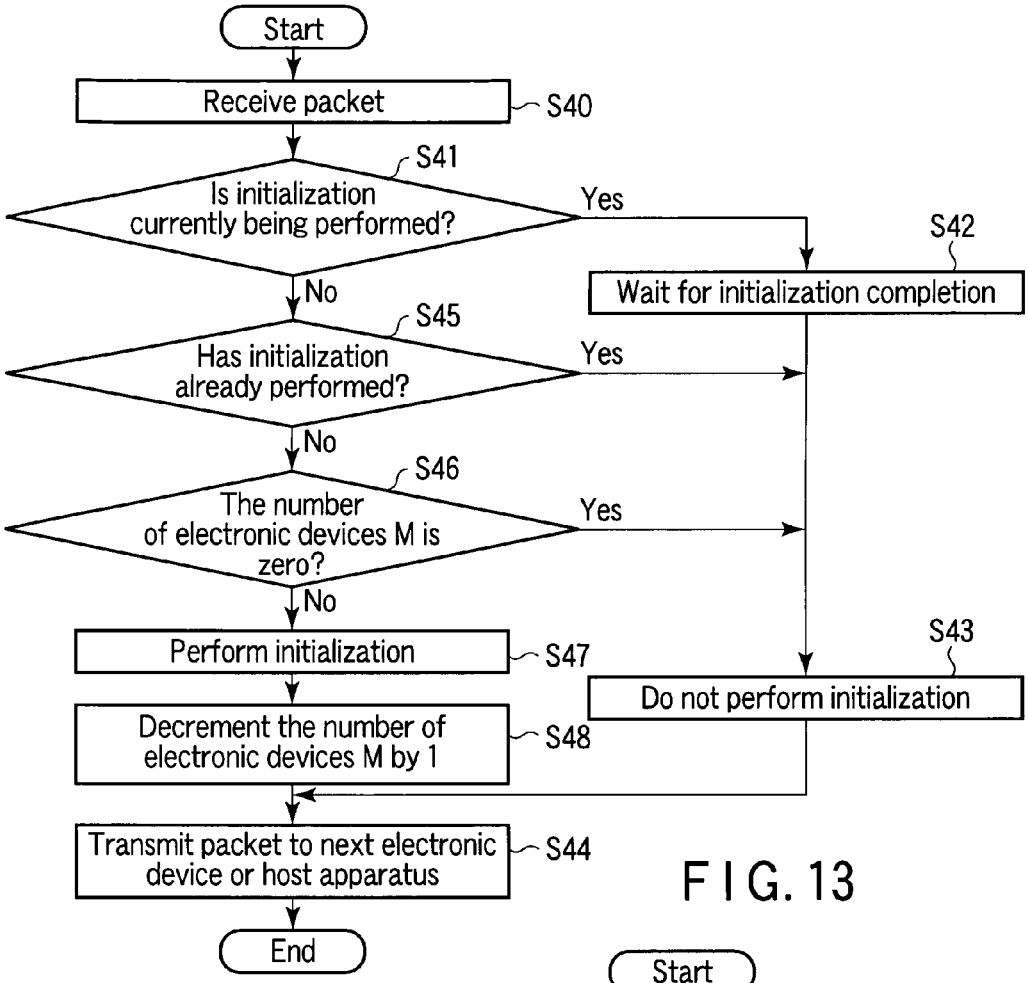
FIG. 13 and FIG. 14 are flowcharts illustrating the electronic device of the first embodiment.

FIG. 13 is a flowchart illustrating an operation of the electronic device 4 in receiving the packet including the initialization command, and the flowchart of FIG. 13 is common to the electronic devices 4-1 to 4-N.

As illustrated in FIG. 13, the electronic device 4 receives the packet at the input signal pin 5 (Step S40). When recognizing that the received packet includes the initialization command from the command identifier of the packet header 51 of the packet, the packet decoder 7 notifies the processing unit 8 of the initialization command included in the packet and the number of electronic devices M of the payload 52. The processing unit 8 determines whether the electronic device 4 is currently initializing. When the electronic device 4 is currently executing the initialization (YES in Step S41), the processing unit 8 waits for the initialization completion (Step S42). After the initialization completion, the processing unit 8 does not perform the initialization again (Step S43), the processing unit 8 causes the packet update circuit 10 to transmit the received packet to the next electronic device 4 (in the case of the electronic device 4-N, to the host apparatus 2) with no change (Step S44).

When the electronic device 4 is not currently being initialized, the processing unit 8 determines whether the electronic device 4 has been already initialized. When the electronic device 4 has been already initialized (YES in Step S45), the processing unit 8 does not perform the initialization again (Step S43). The processing unit 8 causes the packet update circuit 10 to transmit the received packet to the next electronic device 4 (in the case of the electronic device 4-N, to the host apparatus 2) with no change (Step S44).

On the other hand, when the electronic device 4 is not initialized (NO in Step S45), the processing unit 8 confirms whether the number of electronic devices M of the payload 52 is "0" (Step S46). When the number of electronic devices M is "0" (YES in Step S46), the processing unit 8 goes to Step S43, and the processing unit 8 goes to Step S44 without performing the initialization.

When the number of electronic devices M is not "0" (NO in Step S46), the processing unit 8 performs the initialization (Step S47). The processing unit 8 commands the packet update circuit 10 to decrement the number of electronic devices of the payload 52 (Step S48). That is, the number of electronic devices M is updated to M−1. The packet update circuit 10 outputs the packet in which the number of electronic devices M of the payload 52 is updated (Step S44). At this point, in response to the start of the initialization in Step S47, the packet update circuit 10 executes the processing in Step S44 without waiting for the initialization completion of the electronic device 4.

The host apparatus 2 repeatedly issues the initialization packet 50 until the host apparatus 2 receives the initialization packet 50 in which the number of electronic devices M is not "0". The number of devices that can be initialized is reset at the same time as the initialization packet 50 is issued. In other words, the host apparatus 2 can confirm that the initialization is completed for all the electronic devices 4-1 to 4-N by receiving the packet 50 of M≠"0".

Figure 14:
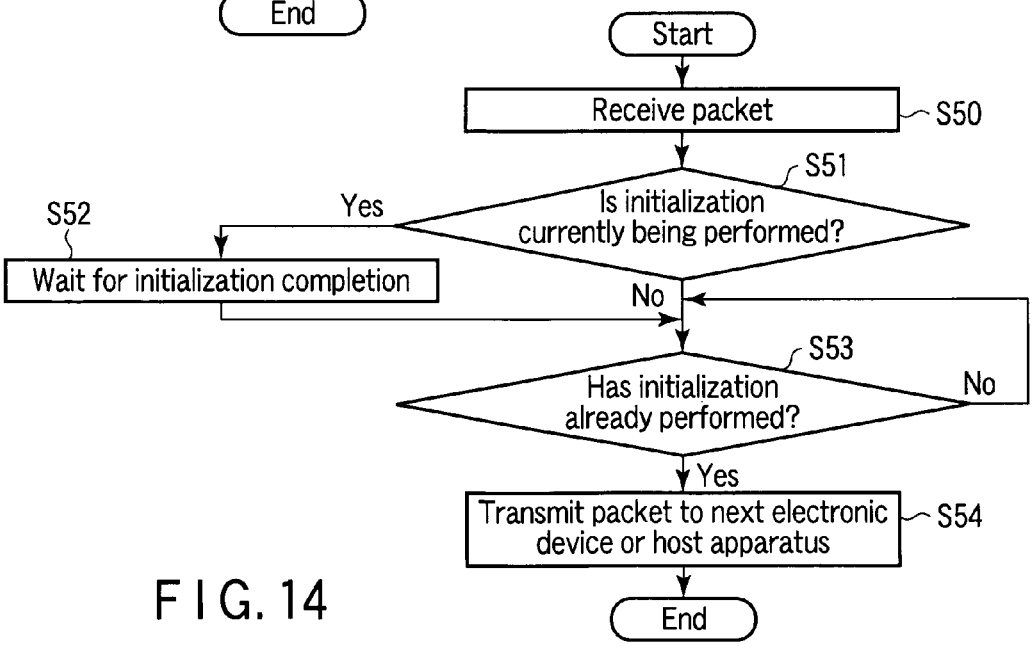

The confirmation whether the initialization is completed for all the electronic devices 4 can be made by transmitting an initialization completion confirming command. An operation of the electronic device 4 in receiving the initialization completion confirming command will be described with reference to FIG. 14. FIG. 14 is a flowchart illustrating the operation of the electronic device 4 in receiving the packet including the initialization completion confirming command, and the flowchart of FIG. 14 is common to the electronic devices 4-1 to 4-N.

As illustrated in FIG. 14, the electronic device 4 receives the packet at the input signal pin 5 (Step S50). When recognizing that the packet includes the initialization completion confirming command from the command identifier of the packet header of the received packet, the packet decoder 7 notifies the processing unit 8 that the packet includes the initialization completion confirming command. The processing unit 8 determines whether the electronic device 4 is currently being initialized. When the electronic device 4 is currently being initialized (YES in Step S51), the processing unit 8 waits for the initialization completion (Step S52). After the initialization completion, the processing unit 8 causes the packet update circuit 10 to transmit the received packet to the next electronic device 4 (in the case of the electronic device 4-N, to the host apparatus 2) without change (Step S54).

When the electronic device 4 is not currently being initialized, the processing unit 8 determines whether the electronic device 4 has been already initialized. When the electronic device 4 has been already initialized (YES in Step S53), the processing unit 8 commands the packet update circuit 10 to transmit the received packet to the next electronic device 4 (in the case of the electronic device 4-N, to the host apparatus 2) without change (Step S54). Therefore, the packet is transferred to the next electronic device 4. On the other hand, when the electronic device 4 is not initialized yet (NO in Step S53), the processing unit 8 does not transmit the packet to the next electronic device 4. That is, the packet stays in the electronic device 4.

Thus, the initialization is executed in each M of the electronic devices. In other words, the N electronic devices are divided into L=(N/M) groups, and the initialization is collectively performed to the electronic devices belonging to each group (Steps S14-1 to S14-L of FIG. 2).

A specific example of Step S14 will be described with reference to FIG. 15 to FIG. 18. FIG. 15 to FIG. 18 are block diagrams of the semiconductor system 1, and FIG. 15 to FIG. 18 illustrate the case in which the semiconductor system 1 includes 15 (N=15) electronic devices 4 similarly to the case of FIG. 11. In FIG. 15 to FIG. 18, square marks added to the side of the arrow between the devices indicate the payload of the packet 50, that is, the number of electronic devices M. Similarly to the case of FIG. 11, it is assumed that the device ID is provided to each electronic device 4.

Figure 15:
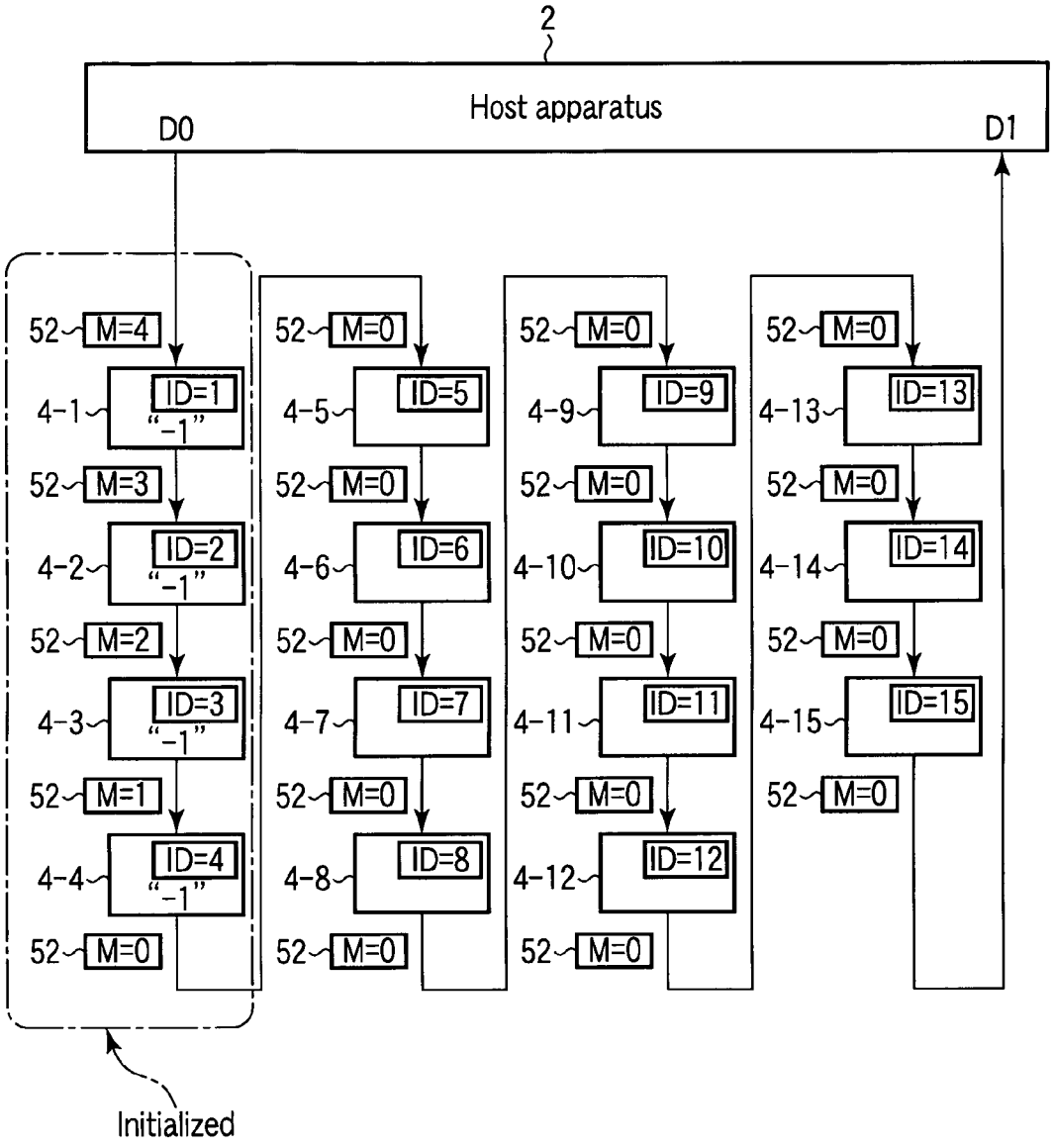
FIGS. 15 to 18 are block diagrams of the semiconductor system of the first embodiment.

FIG. 15 illustrates the state in which the initialization is not performed yet to any electronic devices 4 while the initialization command is issued. As illustrated in FIG. 15, it is assumed that the host apparatus 2 issues the packet while the number of electronic devices M is set to "4". That is, the host apparatus 2 can initialize once up to four electronic devices.

As illustrated in FIG. 15, the packet (M="4") including the initialization command is received by the electronic device 4-1. The electronic device 4-1 is not initialized yet (NO in Step S45), and the number of electronic devices M is "4" (NO in Step S46). Therefore, the processing unit 8 performs the initialization (Step S47), the processing unit 8 updates the number of electronic devices M to M−1="3" (Step S48), and the processing unit 8 transmits the packet to the next electronic device 4-2. In FIG. 15, "−1" added to the electronic device 4 means that the number of electronic devices M is decremented.

Similarly to the electronic device 4-1, the electronic device 4-2 that receives the packet (M="3") including the initialization command performs the initialization, and the electronic device 4-2 decrements and updates the number of electronic devices M from "3" to "2", and transmits the packet to the electronic device 4-3. The electronic devices 4-3 and 4-4 perform the similar operation.

As a result of the decrement of the number of electronic devices M by the electronic device 4-4, the number of electronic devices M becomes "0." Accordingly, the electronic devices 4-5 to 4-15 transfer the packet to the subsequent electronic devices 4-6 to 4-16 without performing the initialization. The final electronic device 4-16 of the ring connection transmits the packet with M="0" to the host apparatus 2.

Figure 16:
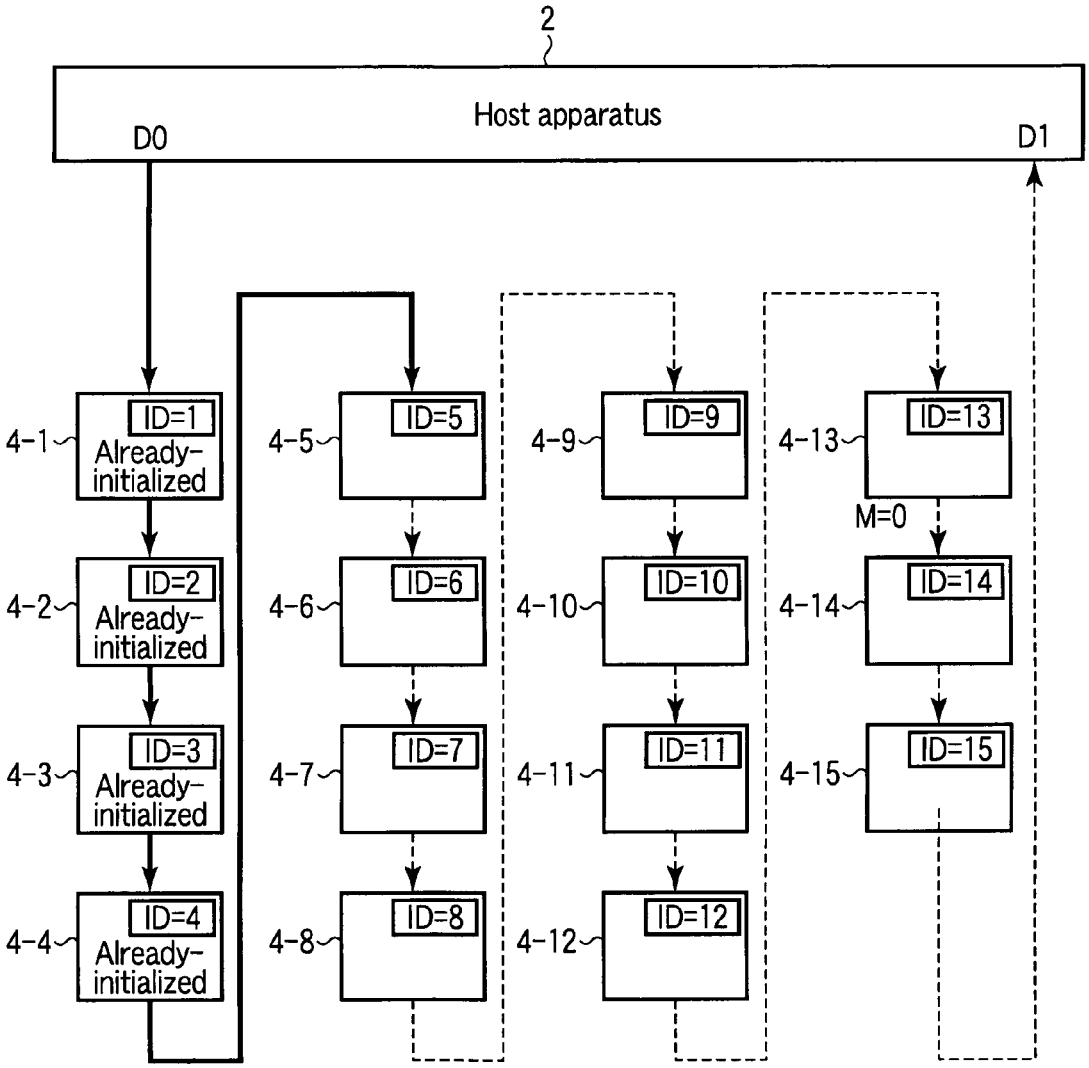

The host apparatus 2 repeatedly issues the initialization command until the host apparatus 2 receives the value except the value of M="0". Alternatively, after issuing the initialization command specific times, the host apparatus 2 issues the initialization completion confirming command in arbitrary timing to transmit the packet including the initialization completion confirming command to the semiconductor device 3. FIG. 16 illustrates the state in which the initialization completion confirming command is issued after the state in FIG. 15.

The packet including the initialization completion confirming command is received by the electronic device 4-1 (Step S50). Because the electronic device 4-1 has been already initialized (YES in Step S53), the electronic device 4-1 transfers the packet to the next electronic device 4-2 (Step S54). At this point, because the electronic devices 4-1 to 4-4 are initialized, the packet reaches the electronic device 4-5. However, the electronic device 4-5 is not initialized yet, the packet stays in the electronic device 4-5 but the packet is not returned to the host apparatus 2. Therefore, the host apparatus 2 can recognize the existence of the electronic device 4 whose initialization is not completed.

Figure 17:
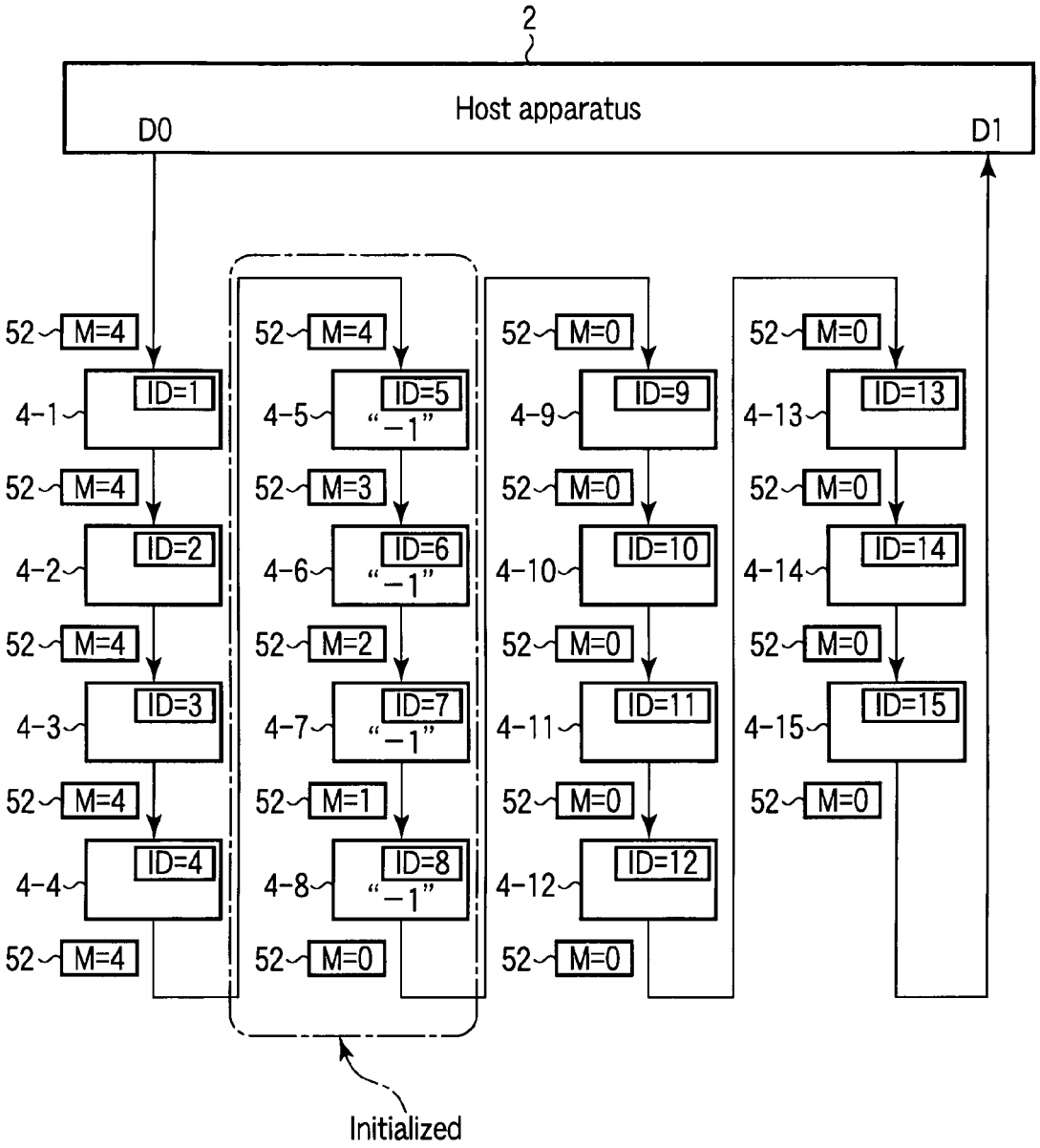

Accordingly, the host apparatus 2 re-issues the packet including the initialization command to transmit the packet to the semiconductor device 3. FIG. 17 illustrates this state. As illustrated in FIG. 17, because the electronic devices 4-1 to 4-4 have been already initialized (YES in Step S41), the packet reaches the electronic device 4-5 without change. The electronic devices 4-5 to 4-8 are initialized in the manner similar to that of FIG. 15. The packet including the initialization completion confirming command reaches the electronic device 4-9.

Figure 18:
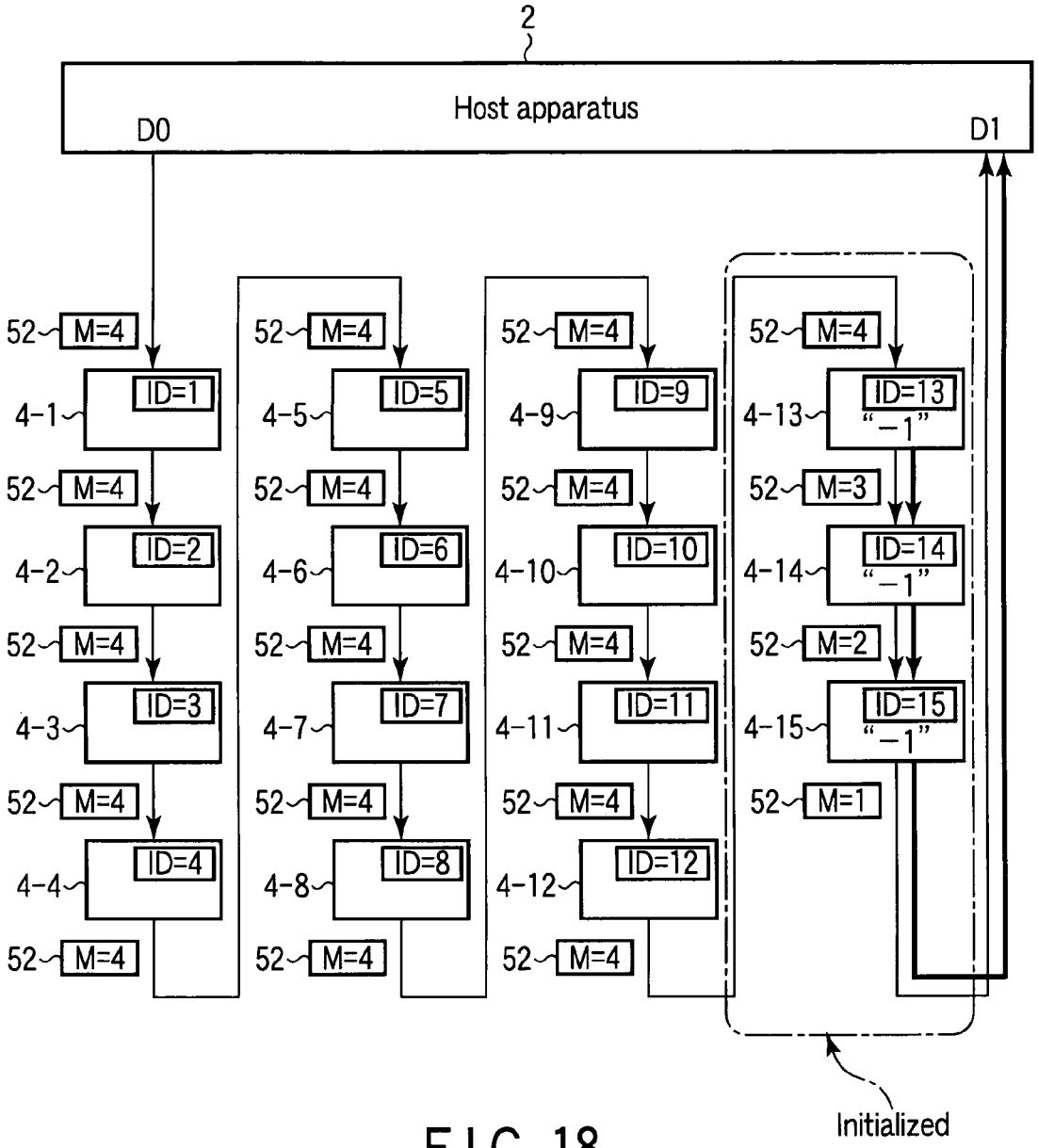

Then the host apparatus 2 issues the packet including the initialization command twice, thereby initializing all the electronic devices 4. FIG. 18 illustrates this state. When all the electronic devices 4 are initialized, the packet including the initialization completion confirming command is transmitted from the electronic device 4-16 to the host apparatus 2 (a bold-line arrow in FIG. 18 indicates a flow of the packet including the initialization completion confirming command). Therefore, the host apparatus 2 recognizes that all the electronic devices 4-1 to 4-16 are initialized. Obviously, even if the initialization completion confirming command is not issued, the host apparatus 2 receives the packet 50 of M="1" (M≠"0") from the electronic device 4-15 at the time of FIG. 18, whereby the host apparatus 2 can recognize that all the electronic devices 4 are initialized.

The above initialization technique initializes the electronic devices by grouping the electronic devices to shorten the initialization for the plural electronic device, and to enable the initialization within a power supply current supported by the host. The method may be implemented by defining an upper limit of an initialization current necessary for each electronic device. However, it is considered that sometimes the current necessary for the initialization depends on the electronic device. For example, it is considered that the initialization can be performed in a halftime when the current necessary for the initialization becomes double. In an embedded system environment, sometimes the initialization time can further be shortened by previously designating the optimum initialization group in each electronic device. The further shortened initialization time can be realized by setting a group number to each electronic device. The group number indicates that the initialization is performed to the electronic device in which times of initialization command. When the group number is set, the number of devices that can be initialized in the initialization command is ignored, each electronic device counts the number of received initialization commands, and each electronic device starts the initialization when the number of received initialization commands is matched with the group number. When the initialization is currently being performed, the electronic device waits for the initialization completion to output the initialization command. The host system can select the optimum initialization procedure according to the feature of the electronic device. This point is described in detail in a second embodiment.

Step S15

Step S15 of FIG. 2 will be described below. In order to set a condition that all the electronic devices can be operated, the host apparatus 2 issues a command to read the setting value by broadcast. Parameters such as a maximum clock frequency range, time-out value, and various symbol lengths are indicated as an argument of the command, each electronic device does not update the argument that can be dealt therewith, and the electronic device updates the argument that cannot be dealt therewith to the parameter that can be dealt therewith. The parameter received by the host apparatus 2 includes the condition that all the electronic devices can be operated.

Step S16

Step S16 of FIG. 2 will be described below. Because the host apparatus 2 determines the operating condition common to the electronic devices 4 in Step S15, the same value is set to all the electronic devices 4 by a command to write the setting value by broadcast (the value is set to the register 9 of each electronic device 4).

This point will be described by taking a specific example. FIG. 19 is a table illustrating the information read in Step S15, and FIG. 19 illustrates a maximum operating frequency and operation timing in the case of the 15 electronic devices by way of example.

As illustrated in FIG. 19, it is assumed that the electronic devices 4-1 to 4-15 have the maximum operating frequencies f0 to f15, respectively, while the host apparatus has the maximum operating frequency f0. It is assumed that the lowest frequency is the maximum operating frequency f3 of the electronic device 4-3. From the information of FIG. 19, the host apparatus 2 can recognize that all the electronic devices 4-1 to 4-15 and the host apparatus 2 can be operated at the frequency f3.

It is assumed that the electronic devices 4-1 to 4-15 have operation timings T1 to T15, respectively, while the host apparatus 2 has operation timing T0. It is assumed that the worst timing is the operation timing T1 of the electronic device 4-1. From the information of FIG. 19 the host apparatus 2 can recognize that all the electronic devices 4-1 to 4-15 and the host apparatus 2 can be operated in operation timing T1.

As a result of referring to the capabilities, the host apparatus 2 determines the operating frequencies of the electronic devices 4-1 to 4-15 as the operating frequency f3 and determines the operation timings of the electronic devices 4-1 to 4-15 as the operation timing T1. The host apparatus 2 writes the operating frequency f3 and operation timing T1 as the operating conditions in the register 9 of each electronic device 4. FIG. 20 illustrates a packet 60 that is issued by the host apparatus 2 at this point.

As illustrated in FIG. 20, in the packet 60, a command identifier corresponding to the register write command is stored in a packet header 61, and the operating frequency f3 and the operation timing T1 are stored in a payload 62. The operating frequency f3 and the operation timing T1 are sequentially written in the register of each electronic device 4 by transmitting the packet 60 (Steps S16-1 to S16-N). The packet 60 may be transmitted by the broadcast, unicast, or multicast.

The configuration set in Step S16 may include a length of a specific symbol, a kind of the packet supported, power control mode, and the number of retry times in addition to the maximum operating frequency and the operation timing.

Step S17

Step S17 of FIG. 2 will be described below. The operating conditions common to all the electronic devices 4 are determined in the sequences in Steps S15 and S16. Sometimes a transfer block size and the like depend on an individual I/O device. Accordingly, the host apparatus 2 reads the capability of the electronic devices 4 using the unicast command when the electronic device 4 has the parameter that should individually be set (Steps S17A-1, S17A-1, . . . , and S17A-N of FIG. 2), the host apparatus 2 determines the optimum value satisfying both the capability of the host apparatus 2 and the capability of the electronic device 4, and the host apparatus 2 sets the optimum value to the electronic device 4 using the unicast command (Steps S17B-1, S17B-1, . . . , and S17B-N of FIG. 2).

Examples of the parameter include a size of a buffer used in the data transfer and data transfer timing.

Effect

As described above, the speed enhancement of the initialization operation can be achieved in the semiconductor device of the first embodiment.

(1) In the configuration of the first embodiment, the host apparatus 2 determines the bus interface that can be connected to the electronic device 4 can be used by detecting the voltage level (Step S10 of FIG. 2). That is, the host apparatus 2 transmits the level STB to the electronic device 4, and the host apparatus 2 determines that the bus interface can be used when the level STB is returned from the electronic device 4. In other words, host apparatus 2 determines that the bus interface can be used by detecting that the signal D1 changes from the in-phase level to the differential level after the signal D0 changes from the in-phase level to the differential level.

The same holds true for the electronic device 4. When the host apparatus 2 transmits the level STB to the electronic device 4, the electronic device 4 detects that the signal D0 changes from the in-phase level to the differential level, and the electronic device 4 determines that the bus interface can be used.

Thus, the availability of the bus interface can be determined at high speed by detecting the voltage levels of the signals D0 and D1. When the bus interface can be used, the host apparatus 2 transmits the symbol SYN, whereby each electronic device 4 synchronizes the internal clock using the input symbol SYN. The electronic device 4 continuously output the level STB during the clock synchronization by the internal PLL, and the electronic device 4 outputs the symbol SYN in synchronization with the clock when the clock synchronization is completed. When receiving the symbol SYN, the host apparatus 2 recognizes that the synchronization is completed for all the electronic devices 4.

The host apparatus 2 transmits a symbol IDLE after receiving the symbol SYN (time t4 of FIG. 3). The symbol IDLE is a symbol indicating that the host apparatus 2 is in an idle state.

(2) In the configuration of the first embodiment, when receiving the symbol IDLE, the electronic device 4 that retains the boot code voluntarily transmits the boot code to the host apparatus 2 without waiting for the command from the host apparatus 2 (Step S12 of FIG. 2).

Plural command procedures are required when the host apparatus 2 issues the command. Therefore, it takes a relatively long time to read the boot code. In the system that does not include the boot device, it is necessary to implement a dedicated boot ROM in order to read the program starting up the system from the memory device.

On the other hand, in the first embodiment, because the host controller directly loads the boot code from the boot device onto the system memory, it is not necessary that the host apparatus 2 generate the command, and the boot ROM is omitted, which allows the achievement of cost reduction. Accordingly, in the host apparatus 2, the system is quickly started up, and the speed enhancement of the initialization can be achieved in the electronic device 4.

(3) In the configuration of the first embodiment, during the allocation of the device ID, the host apparatus 2 broadcasts the packet in order to make the request of the device ID of each electronic device 4 (Step S13 of FIG. 2). The packet is transferred among the electronic devices 4 in the order of connection while the device ID is issued in each electronic device 4. The device ID in the packet is updated every time the packet passes through the electronic device 4, and the updated value becomes the device ID of each electronic device 4. Accordingly, the device IDs do not overlap each other. Therefore, it is not necessary that the host apparatus 2 confirm the presence or absence of the overlap between the device IDs, so that the initialization operation can be simplified.

(4) In the configuration of the first embodiment, the initialization is performed using the broadcast command similarly to the allocation of the device ID (Step S14). Accordingly, the speed enhancement of the initialization can be achieved.

Usually it maximally takes about one second to perform the initialization. Accordingly, in the system that includes plural electronic devices, it takes a long time for the user to wait for the initialization completion by the method for issuing the command in each electronic device.

However, when the broadcast command is used, the number of commands issued by the host apparatus 2 can be decreased to simplify the initialization sequence. The plural electronic devices are simultaneously initialized by one command, which allows the shortening of the initialization time.

The host apparatus 2 determines the number of electronic devices 4 that are simultaneously initialized. Usually the current of 100 mA is maximally required to initialize one electronic device 4. However, there is a restriction to current supply ability of the host apparatus. Therefore, the host apparatus 2 stores the number of electronic devices that can be initialized in the packet including the initialization command, and the host apparatus 2 simultaneously initializes the electronic devices as many as the number of electronic devices stored in the packet. The electronic devices 4 are sequentially initialized in the numerical unit, which allows the initialization to be performed in a short time within the current supply ability of the host apparatus 2.

The method in which the group number is used can be adopted to further improve the initialization speed. In the above example method, although the initialization current is restricted up to 100 mA, sometimes the initialization time can be shortened when the larger current is passed. In such cases, the electronic devices to be initialized are divided into groups to which the current can be supplied by the host system, the group number is previously written in the electronic device, the number of issued initialization command is counted, and the electronic device starts the initialization when the count value is matched with the group number. Therefore, the host system can more efficiently customize the initialization.

(5) In the configuration of the first embodiment, the common operating conditions satisfying both the host apparatus 2 and the electronic device 4 are determined based on the capabilities of the host apparatus 2 and electronic device 4 (Steps S15 and S16 of FIG. 2).

For example, in the conventional system, the maximum operating frequency is determined by specifications of the bus. When the bus frequency is extremely increased, the bus frequency is hardly supported on the electronic device side or the host apparatus side. Only the speed enhancement of the bus means very little for the memory device, and the data transfer rate should be determined according to write or read ability of the memory device. For example, because the ability of the memory device is restricted by memory ability, disadvantageously power consumption is increased even if the bus operating frequency is increased to enhance the bus interface speed.

On the other hand, in the first embodiment, the common operating conditions satisfying both the host apparatus 2 and the electronic device 4 are determined by referring to the capabilities of the host apparatus 2 and electronic device 4. Therefore, the optimum operating condition can be set to at least part of the operating ability, and the operating ability of the semiconductor system 1 can be improved. The operating condition is transmitted to the plural electronic devices 4 using the broadcast command, so that the speed enhancement of the initialization can be archived compared with the case in which the operating condition is determined in each electronic device 4.

(6) In the configuration of the first embodiment, the operating condition of the electronic device 4 is individually determined (Step S17 of FIG. 2). Accordingly, the electronic device 4 can sufficiently exert the operating ability. That is, while the operating conditions that should be communalized are determined in Step S15 and S16, the point that is not necessary to be communalized is determined in Step S17. The operating conditions are individually determined, which allows each electronic device 4 to exert the excellent operating ability independently of the abilities of other electronic devices 4.

Second Embodiment

A semiconductor system and an electronic device initializing method according to a second embodiment will be described below. In the second embodiment, the processing in Step S14 of the first embodiment is performed by another method. Because other configurations of the second embodiment are similar to those of the first embodiment, the description is omitted.

First Example

A first example will be described as another method for performing the processing in Step S14. In a host apparatus 2 of the first example, electronic devices 4-1 to 4-N are previously classified into groups. The group number is provided to each group, and the group number is written in a register 9 of the electronic device 4. For example, the operation may be performed in Step S14 or Step S13, or the operation may previously be performed during production.

The number of power units M that can be used to initialize the electronic device 4 by the host apparatus 2 is used instead of the maximum number of electronic devices M that can be initialized at one time. The number of power units M is a value that expresses power (electric power) that can be used for the initialization in a certain unit, and the host apparatus 2 consumes the predetermined number of power units when each electronic device 4 is initialized.

An initialization completion flag CF (Completion Flag) is also used in addition to the group and the number of power units M. The initialization completion flag CF is set to "1" when the initialization is completed for all the electronic devices 4, and, otherwise, the initialization completion flag CF is set to a value except "1" (for example, "0").

(Packet including Initialization Command)

In Step S14, the host apparatus 2 produces a packet 70 illustrated in FIG. 21 to transmit the packet 70 to a semiconductor device 3. As illustrated in FIG. 21, the command identifier indicating the initialization command is included in a packet header 71 of the packet 70, and a group number CC, the number of power units M, and the initialization completion flag CF are included as an argument in a payload. The packet 70 is issued as the broadcast command.

(Operation of Electronic Device 4)

Figure 22:
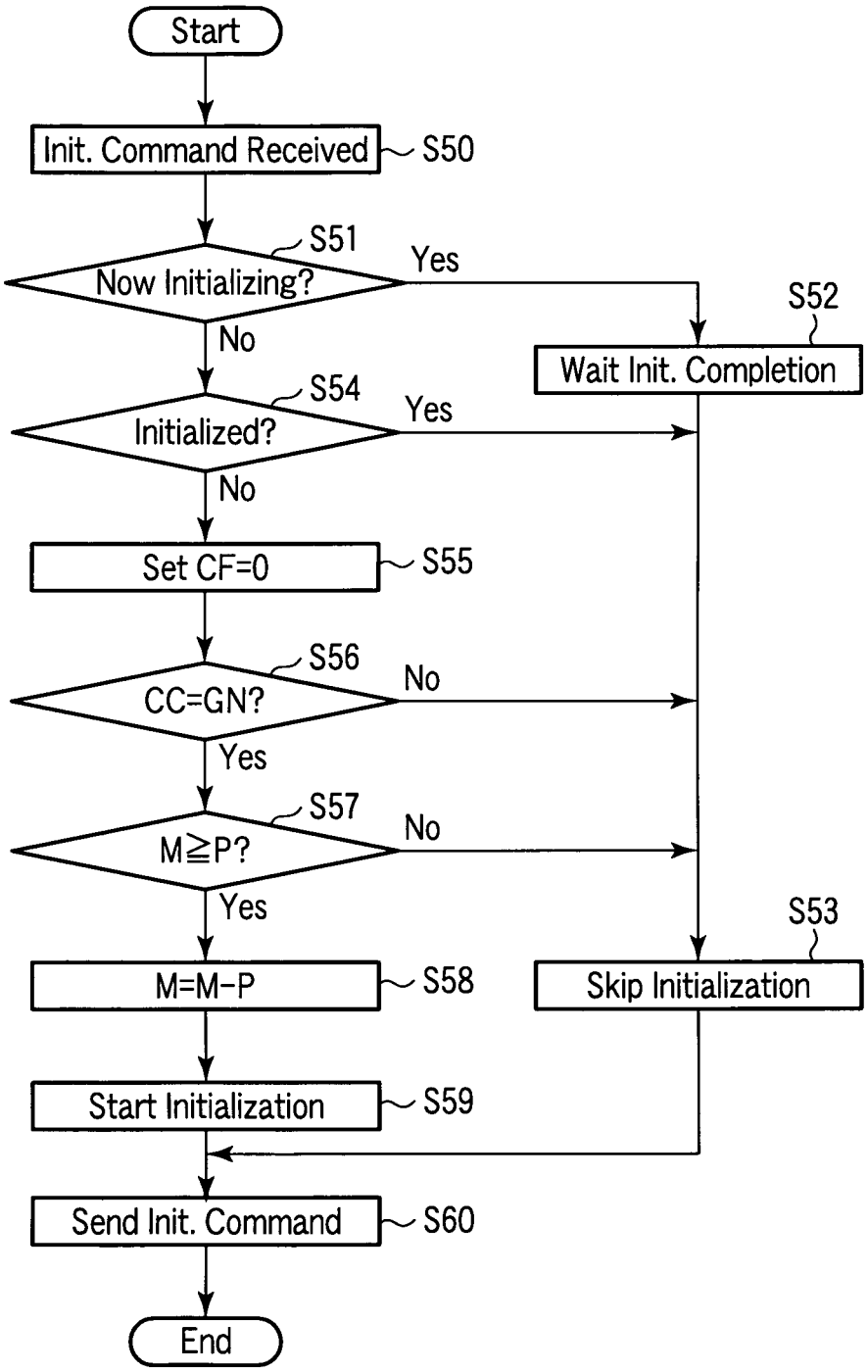
FIG. 22 and FIG. 23 are flowcharts illustrating operations of an electronic device and a host apparatus of the second embodiment.

FIG. 22 is a flowchart illustrating an operation of the electronic device 4 in receiving the packet 70, and the flowchart of FIG. 22 is common to the electronic devices 4-1 to 4-N. As illustrated in FIG. 22, the electronic device 4 receives the packet 70 at an input signal pin 5 (Step S50). When recognizing that the packet includes the initialization command from the command identifier of the packet header 71 of the received packet 70, a packet decoder 7 notifies a processing unit 8 that the packet includes the initialization completion confirming command, and the packet decoder 7 also notifies the processing unit 8 of the group number CC, the number of power units M, and the initialization completion flag CF in the payload. The processing unit 8 determines whether the electronic device 4 is currently being initialized (Step S51). When the electronic device 4 is currently being initialized (YES in Step S51), the processing unit 8 waits for the initialization completion (Step S52). The processing unit 8 does not perform the initialization (Step S53), and the processing unit 8 transmits the packet 70 to the next electronic device 4 (in the case of the electronic device 4-N, host apparatus 2) (Step S60). At this point, a packet update circuit 10 does not update the number of power units M and initialization completion flag CF in the packet 70.

When the electronic device 4 is not currently being initialized (NO in Step S51), and when the electronic device 4 has been already initialized (YES in Step S54), the flow goes to Steps S53 and S60. At this point, the number of power units M and initialization completion flag CF are not updated in the packet 70.

When the electronic device 4 is not currently being initialized (NO in Step S51), and when the electronic device has not been already initialized (NO in Step S54), the processing unit 8 commands the packet update circuit 10 to clear the initialization completion flag CF in the payload to "0" (Step S55). When the initialization completion flag CF is cleared to "0", the host apparatus 2 recognizes that the issuance of the initialization command is continuously required (this point described later). The processing unit 8 also confirms the group number CC in the payload (Step S56). The processing unit 8 determines whether the group number CC is matched with its group number GN stored in a register 9.

When the group number CC is matched with the group number GN (YES in Step S56), the processing unit 8 compares the number of power units M in the payload and the number of power units P consumed in initializing the electronic device 4 (Step S57). For example, the number of power units P for each electronic device 4 may be written in the register 9 of each electronic device 4. In this case, the processing unit 8 compares the number of power units P in the register 9 and the number of power units M in the payload of the received packet. The number of power units P may be written in the register 9 in Step S14 or Step S13, or the processing may previously be performed during production.

The processing unit 8 determines whether (M−P) is not lower than zero, that is, whether the number of power units M is not lower than the number of power units P. When (M−P) is not lower than zero, that is, when the number of power units M is not lower than the number of power units P (YES in Step S57), the processing unit 8 commands the packet update circuit 10 to update the number of power units M in the payload to (M−P) (Step S58). The value of (M−P) indicates a difference in which the power consumed by the electronic device 4 is subtracted from the power that can be supplied by the host apparatus 2, and the value of (M−P) also indicates the number of power units, which is necessary for other electronic devices to perform simultaneously the initialization. The processing unit 8 starts the initialization (Step S59). After the initialization is started, the processing unit 8 causes the packet update circuit 10 to transmit the packet 70 whose the number of power units M and completion flag are updated to the next electronic device 4 (in the case of the electronic device 4-N, to the host apparatus 2) without waiting for the initialization completion (Step S60).

When the group numbers CC and GN are not matched with each other (NO in Step S56), the processing unit 8 goes to Step S60 without performing the initialization (Step S53). That is, the packet 70 is transmitted without updating the number of power units M. The processing unit 8 also goes to Step S60 without performing the initialization (Step S53), when (M−P) is lower than zero, that is, when the number of power units M is lower than the number of power units P (NO in Step S57).

The plural numbers of power units P can be implemented in the electronic device 4. For example, the plural numbers of implementable power units P are previously written in the register 9, and the pieces of processing in Steps S57 to S58 and the initialization can be performed using the numbers of power units P. Alternatively, the electronic device 4 can select the optimum number of power units P with respect to a power unit M indicated in the initialization command (Operation of Host apparatus 2)

Figure 23:
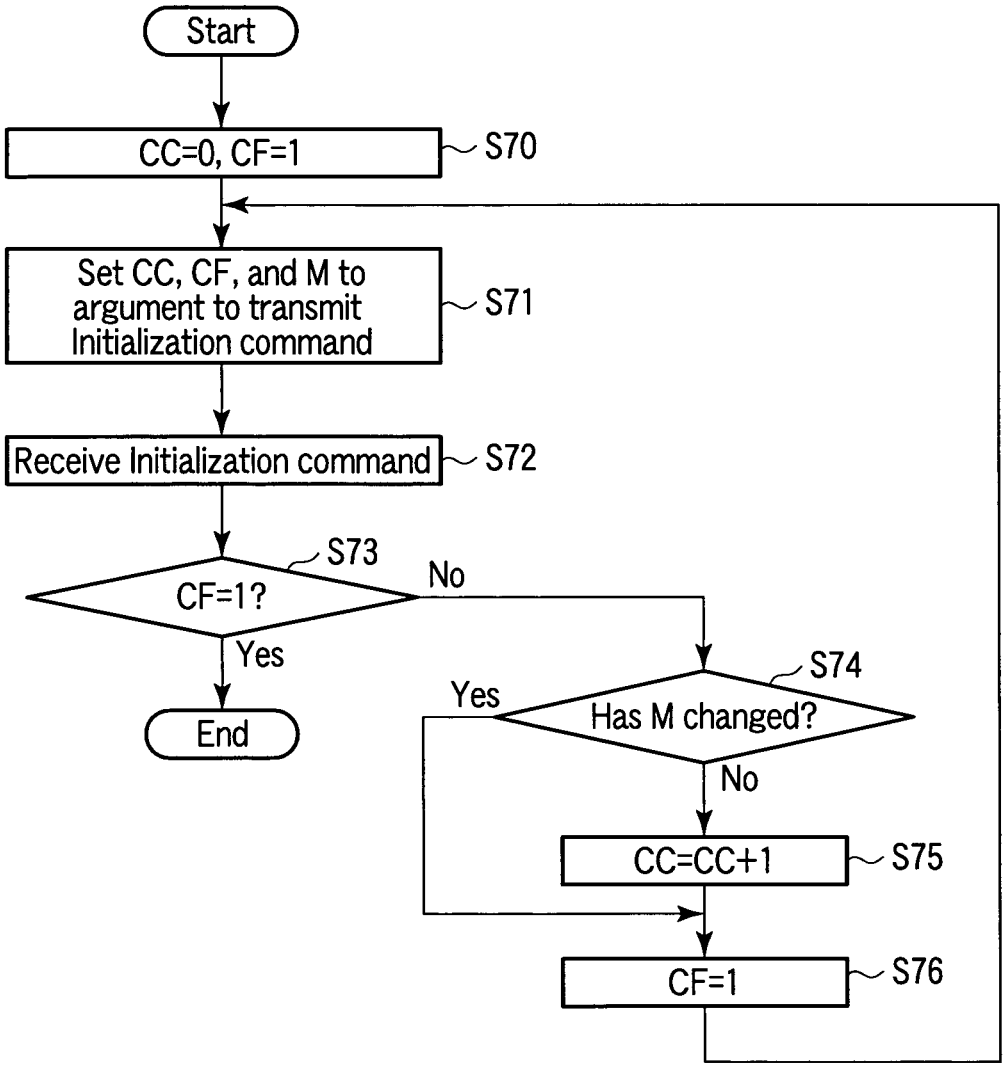

An operation of the host apparatus 2 in performing the processing in Step S14 will be described below with reference to FIG. 23. FIG. 23 is a flowchart illustrating the operation of the host apparatus 2.

As illustrated in FIG. 23, the host apparatus 2 sets the group number initial value CC to zero while setting the initialization completion flag CF to 1 (Step S70). The host apparatus 2 sets the group number CC, the initialization completion flag CF, and the number of power units M to the argument to assemble the packet 70, and the host apparatus 2 transmits the packet 70 by the broadcast command (Step S71).

Then the host apparatus 2 receives the packet 70 that passes through all the electronic devices 4 (Step S72). The host apparatus 2 confirms whether the initialization completion flag CF is 1 in the received packet 70 (Step S73). When the initialization completion flag CF is 1 (YES in Step S73), the host apparatus 2 determines that the initialization is completed for all the electronic devices 4, and the initialization is ended.

On the other hand, when the initialization completion flag CF is not 1 (NO in Step S73), the host apparatus 2 confirms whether the number of power units M changes (Step S74). That is, the host apparatus 2 determines whether the number of power units M included in the received packet 70 differs from the value of the transmission of the packet 70.

When the number of power units M does not change (NO in Step S74), the host apparatus 2 determines that all the electronic devices 4 belonging to the group number CC have already started the initialization or that the initialization is completed for all the electronic devices 4, the host apparatus 2 increments the group number CC (Step S75), the host apparatus 2 sets the initialization completion flag CF to 1, and the host apparatus 2 goes to Step S71 to issue the initialization command again.

When the number of power units M changes (YES in Step S74), the host apparatus 2 determines that possibly the electronic device 4 belonging to the group number does not start the initialization yet, the host apparatus 2 sets the initialization completion flag CF to 1 while leaving the group number CC as it is (Step S76), and the host apparatus 2 goes to Step S71 to issue the initialization command again.

Thus, the host apparatus 2 can confirm whether the initialization is completed for all the electronic devices 4 by checking the initialization completion flag CF of the received packet 70. In other words, it can be said that the initialization command to initialize the electronic device 4 and the initialization completion confirming command to confirm whether the initialization is completed for all the electronic devices 4 are unified in the first example.

However, similarly to the first embodiment, a command to confirm the initialization completion of the electronic device 4 may separately be issued. For example, the packet illustrated in FIG. 21 is used as the initialization completion confirming command by setting the group number CC to a predetermined value. In this case, when the electronic device receives the command, the electronic device that is not currently being initialized instantaneously outputs the command, while the electronic device that is currently being initialized outputs the command after waiting for the initialization completion. When receiving the command, the host apparatus 2 recognizes that the initialization is completed for one group. The host apparatus 2 repeatedly transmits the packet 70 including the initialization command while changing the group number CC until all the electronic devices 4 are initialized.

The initialization command can also be issued before the device ID is allocated to the electronic device 4.

First Specific Example

Figure 24:
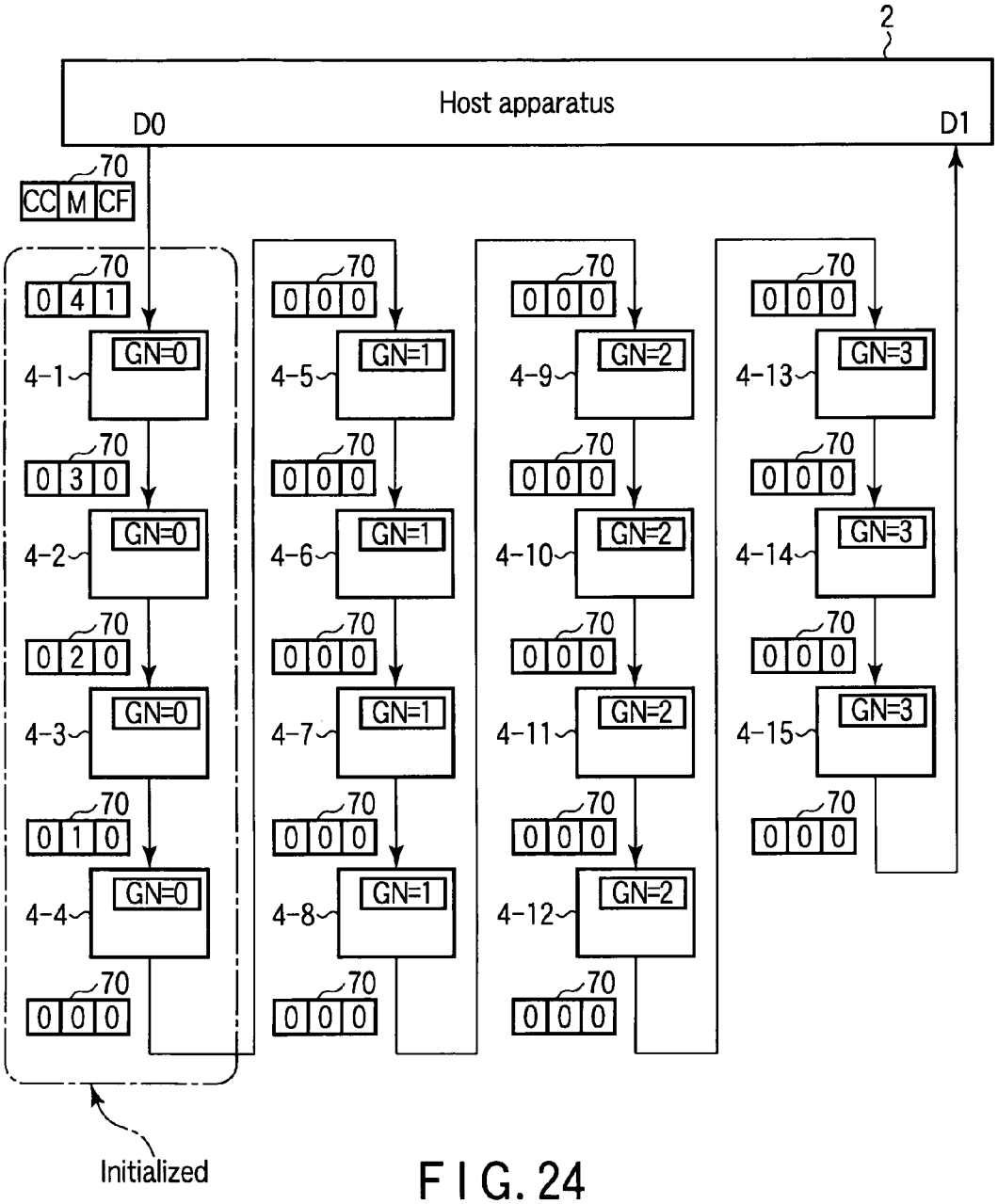
FIGS. 24 to 30 are block diagrams of a semiconductor system of the second embodiment.
Figure 25:
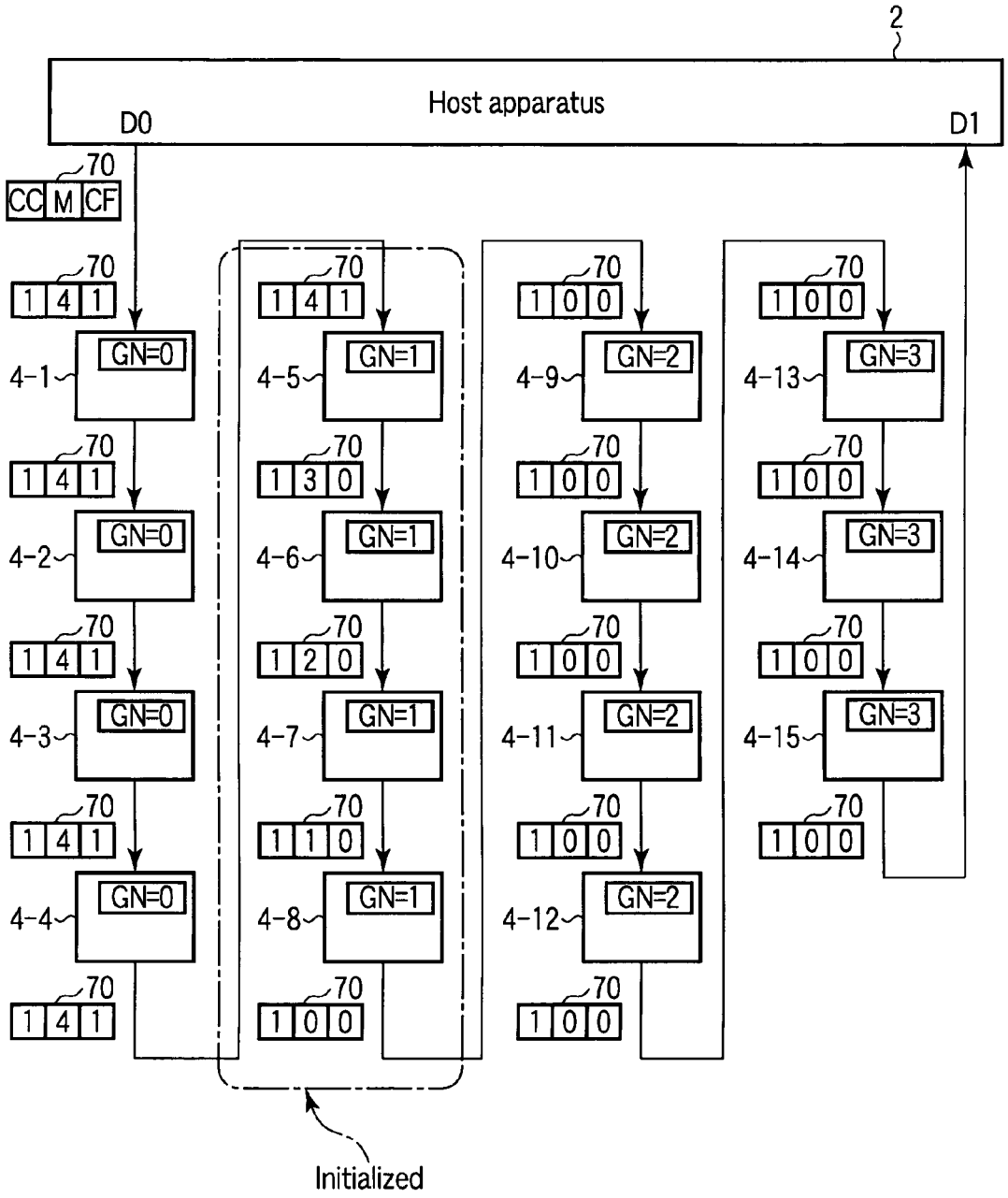

A specific example of the processing in Step S14 of the first example will be described with reference to FIG. 24 and FIG. 25. FIG. 24 and FIG. 25 are block diagrams of the semiconductor system 1, and FIG. 24 and FIG. 25 illustrate that the semiconductor system 1 includes the 15 (N=15) electronic devices 4 similarly to FIG. 11. In FIG. 24 and FIG. 25, square marks added to the side of the arrow between the electronic devices indicate the payload 72 of the packet 70, that is, group number CC, the number of power units M, and the initialization completion flag CF in the order from the left. In FIG. 23, GN=i (i=0 to 3) described in each electronic device 4 indicates the group number GN allocated to each electronic device 4.

As illustrated in FIG. 23, the electronic devices 4-1 to 4-4 are allocated to a 0th group (GN=0), the electronic devices 4-5 to 4-8 are allocated to a first group (GN=1), the electronic devices 4-9 to 4-12 are allocated to a second group (GN=2), and the electronic devices 4-13 to 4-15 are allocated to a third group (GN=3). It is assumed that 1 is the number of power units P necessary to initialize each electronic device.

As illustrated in FIG. 24, the host apparatus 2 transmits the packet 70 while the initialization is not performed yet to any electronic devices 4. As illustrated in FIG. 24, the host apparatus 2 sets the group number CC to zero while setting the initialization completion flag CF to 1, and the host apparatus 2 issues the packet 70. It is assumed that 4 is the number of power units M.

The packet 70 is received by the electronic device 4-1. The group number GN (=0) allocated to the electronic device 4-1 is matched with the group number CC (=0) in the payload of the packet 70 (YES in Step S56). Accordingly, the processing unit 8 of the electronic device 4-1 performs the initialization (Step S59). The processing unit 8 transmits packet 70 to the next electronic device 4-2. At this point, the packet update circuit 10 of the electronic device 4-1 updates the number of power units M to (M−P)=(4−3)=3 while updating the initialization completion flag CF to 0.

Because the electronic device 4-2 that receives the packet 70 is allocated to the 0th group (GN=0), similarly to the electronic device 4-1, the electronic device 4-2 performs the initialization and transmits the packet 70 to the electronic device 4-3. The number of power units M is updated to (M−P)=(3−1)=2. The electronic devices 4-3 and 4-4 perform the similar processing.

The electronic device 4-5 receives the packet 70 from the electronic device 4-4. The electronic device 4-5 is allocated to the first group (GN=1) (NO in Step S56). Accordingly, the electronic device 4-5 transmits the packet 70 to the next electronic device 4-6 without performing the initialization (Step S53). Similarly the electronic devices 4-6 to 4-15 do not perform the initialization. The packet 70 is returned from the electronic device 4-15 to the host apparatus 2.

The host apparatus 2 that receives the packet 70 from the electronic device 4-15 recognizes that the number of power units M of the received packet 70 changes from 4 in transmission to 0 (YES in Step S74), and the host apparatus 2 retransmits the packet 70 having CC=0 and CF=1 (Step S71). After the initialization, the electronic device 4-1 transmits the packet 70 to the next electronic device 4-2 without changing the argument. The electronic devices 4-2 to 4-4 perform the similar processing.

Although the electronic device 4-5 that receives the packet 70 from the electronic device 4-4 updates the initialization completion flag CF to 0 (Step S55), because of CCGN (NO in Step S56), the electronic device 4-5 does not perform the initialization (Step S53), and the electronic device 4-5 transmits the packet 70 to the next electronic device 4-6 without updating the number of power units M. The electronic devices 4-6 to 4-15 perform the similar processing. The packet 70 is returned from the electronic device 4-15 to the host apparatus 2.

The host apparatus 2 that receives the packet 70 from the electronic device 4-15 recognizes that the number of power units M of the received packet 70 does not change from 4 in transmission (NO in Step S74), and the host apparatus 2 retransmits the packet 70 having CC=CC+1=1 (Step S75) and CF=1 (Step S71). FIG. 25 illustrates this state.

As illustrated in FIG. 25, because the electronic devices 4-1 to 4-4 have been already initialized, the electronic devices 4-1 to 4-4 transmit the packet 70 without updating the initialization completion flag CF and the number of power units M. Accordingly, the electronic device 4-5 receives the packet 70 having CC=1, M=4, and CF=1. Therefore, the electronic device 4-5 starts the initialization, updates the initialization completion flag CF to 0, updates the number of power units M from 4 to 3, and transmits the packet 70. Similarly the electronic devices 4-6 to 4-8 start the initialization.

Then the host apparatus 2 retransmits the packet 70 having CC=1. After the initialization is completed for the electronic devices 4-5 to 4-8, the host apparatus 2 receives the packet 70 having the value of M identical to that in the transmission. Therefore, the host apparatus 2 transmits the packet 70 whose group number CC is updated. Then the electronic devices 4-9 to 4-12 and the electronic devices 4-13 to 4-15 are similarly initialized.

When the initialization of the electronic device 4-15 is completed, because the host apparatus 2 receives the packet 70 having CF=1, the host apparatus 2 recognizes that the initialization is completed for all the electronic devices 4-1 to 4-15, and completes the initialization operation.

Second Specific Example

Figure 26:
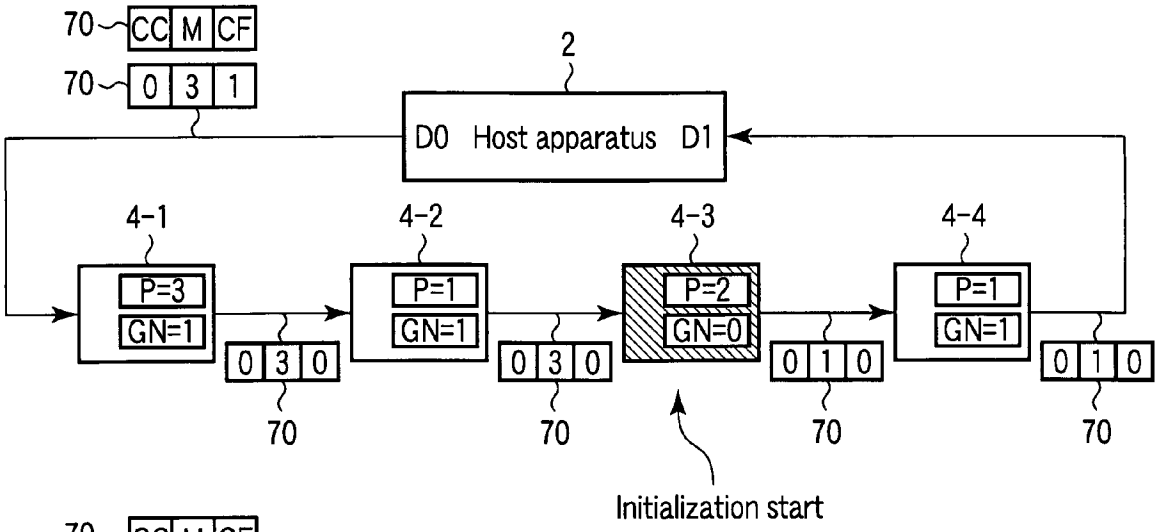

Another specific example will be described with reference to FIG. 26 to FIG. 30. FIG. 26 to FIG. 30 are block diagrams of the semiconductor system 1, and FIG. 26 and FIG. 30 illustrate that the semiconductor system 1 includes the 4 (N=4) electronic devices 4. In FIG. 26 and FIG. 30, square marks added to the arrow between the electronic devices indicate the payload of the packet 70, that is, group number CC, the number of power units M, and the initialization completion flag CF in the order from the left. The number of power units P and the group number GN of each electronic device are illustrated in FIG. 26.

As illustrated in FIG. 26, the host apparatus 2 transmits the packet 70 while the initialization is not performed yet to any electronic devices 4. As illustrated in FIG. 26, the host apparatus 2 sets the group number CC to zero while setting the initialization completion flag CF to 1, and the host apparatus 2 issues the packet 70. It is assumed that 3 is the number of power units M.

The electronic device 4-1 that first receives the packet updates the initialization completion flag CF of the packet 70 from 1 to 0 (Step S55). Because of CC≠GN (NO in Step S56), the electronic device 4-1 transmits the packet 70 to the electronic device 4-2 without updating the value of M. The electronic device 4-2 performs the similar processing. In the electronic device 4-3, CC=GN is obtained (YES in Step S56). Accordingly, the electronic device 4-3 starts the initialization while updating the value of M to (M−P)=(3-2)=1, and the electronic device 4-3 transmits the packet 70. Because of CC≠GN in the electronic device 4-4 (NO in Step S56), the electronic device 4-4 returns the packet 70 to the host apparatus 2 without performing the initialization.

Figure 27:
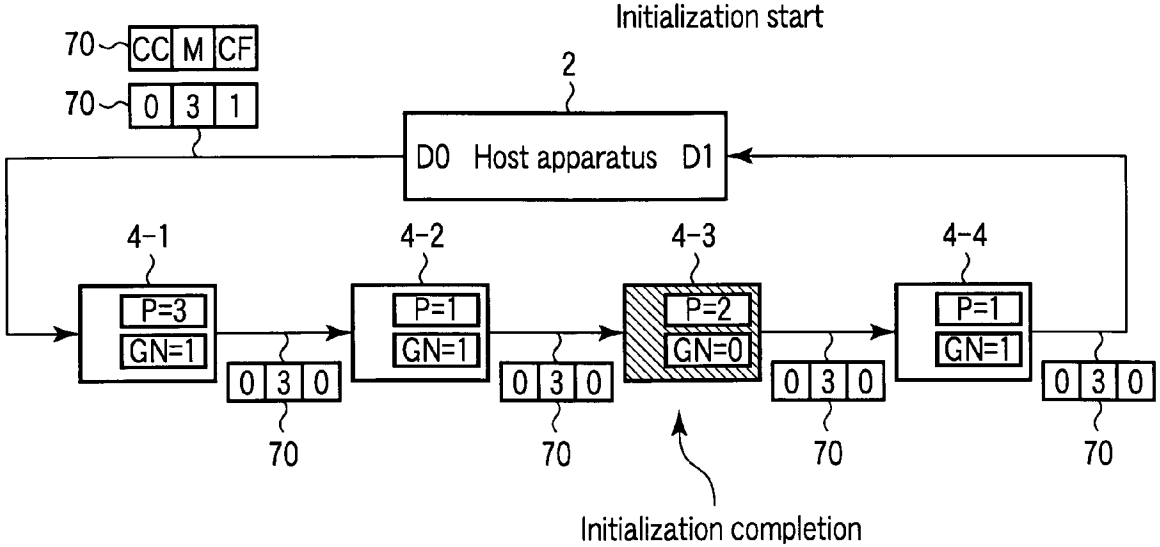

As illustrated in FIG. 27, because the value of M of the packet that is received by the host apparatus 2 in FIG. 26 changes from 3 in transmission to 1 (YES in Step S74), the host apparatus 2 retransmits the packet 70 having CC=0.

The electronic device 4-1 that first receives the packet 70 updates the initialization completion flag CF of the packet 70 from 1 to 0 (Step S55). Because of CC≠GN (NO in Step S56), the electronic device 4-1 transmits the packet 70 to the electronic device 4-2 without updating the value of M. The electronic device 4-2 performs the similar processing. After the initialization is ended (Step S52), the electronic device 4-3 transmits the packet 70 without updating the value of M. Because of CC≠GN in the electronic device 4-4 (NO in Step S56), the electronic device 4-4 returns the packet 70 to the host apparatus 2 without performing the initialization.

Figure 28:
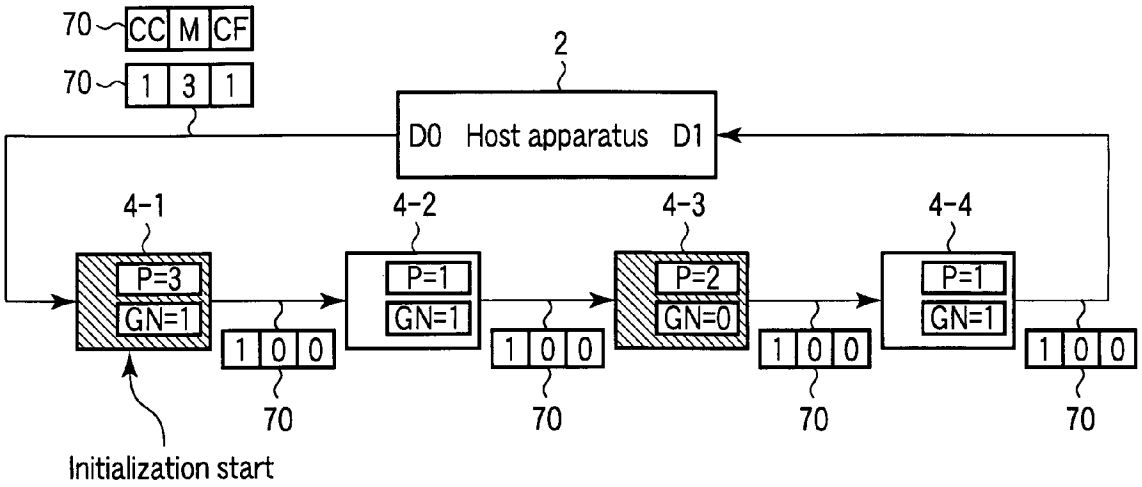

As illustrated in FIG. 28, because the value of M of the packet that is received by the host apparatus 2 in FIG. 27 does not change from 3 (NO in Step S74), the host apparatus 2 transmits the packet 70 having CC C+1=(0+1)=1.

The electronic device 4-1 that first receives the packet 70 updates the initialization completion flag CF of the packet 70 from 1 to 0 (Step S55). Because of CC=GN in the electronic device 4-1 (YES in Step S56), the electronic device 4-1 starts the initialization while updating the value of M to (M−P)=(3−3)=0, and the electronic device 4-1 transmits the packet 70. Although CC=GN is obtained in the electronic device 4-2 (YES in Step S56), because of M<P (NO in Step S57), the electronic device 4-1 transfers the packet 70 without performing the initialization. The electronic devices 4-3 and 4-4 do not perform the initialization.

Figure 29:
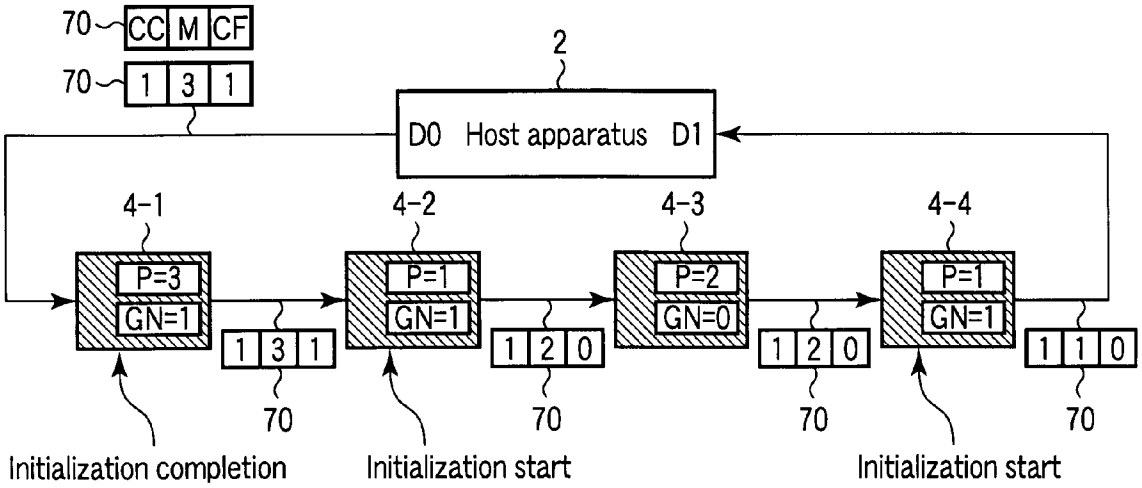
Figure 30:
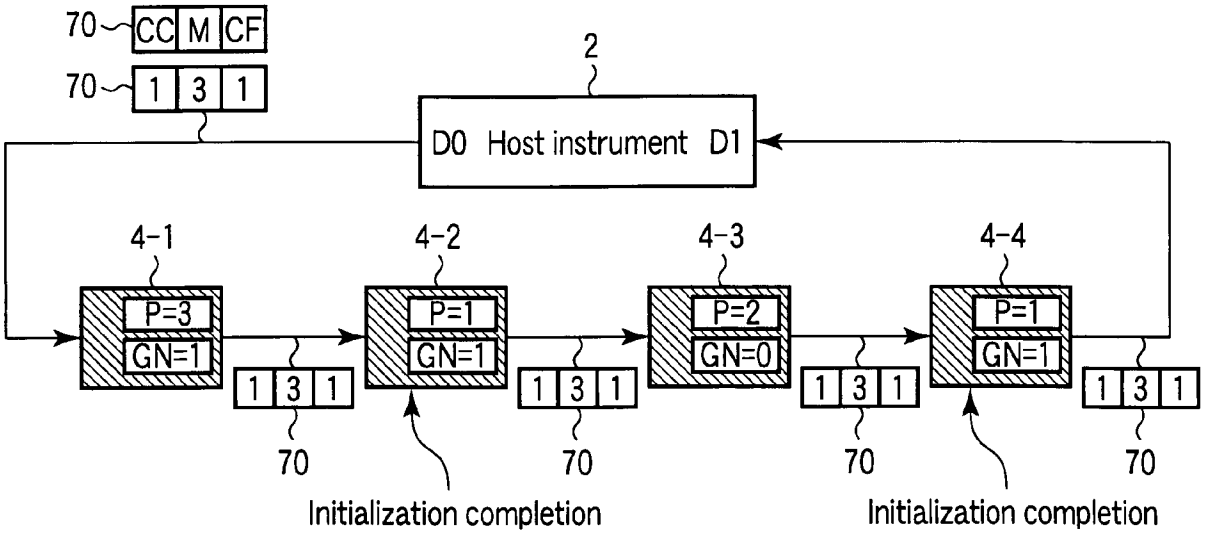

As illustrated in FIG. 29, because the value of M of the packet that is received by the host apparatus 2 in FIG. 28 changes from 3 to 0 (YES in Step S74), the host apparatus 2 retransmits the packet 70 having CC=1.

After the initialization is completed (Step S52), the electronic device 4-1 that first receives the packet 70 transfers the packet 70 to the electronic device 4-2 without updating the values of M and CF. Because of CC=GN in the electronic device 4-2 (YES in Step S56), the electronic device 4-2 starts the initialization while updating the value of CF to 0, and the electronic device 4-2 updates the value of M to (M−P)=(3−1)=2 to transmit the packet 70. The electronic device 4-3 directly transfers the received packet 70 to the electronic device 4-4. Because of CC=GN in the electronic device 4-4 (YES in Step S56), the electronic device 4-4 starts the initialization while updating the value of M to (M−P)=(2−1)=1, and the electronic device 4-4 transmits the packet 70.

As illustrated in FIG. 30, because the value of M of the packet that is received by the host apparatus 2 in FIG. 29 changes from 3 to 1 (YES in Step S74), the host apparatus 2 retransmits the packet 70 having CC=1.

The electronic device 4-1 that first receives the packet 70 directly transfers the packet 70 to the electronic device 4-2 (YES in Step S54). When the initialization is completed (Step S52), the electronic device 4-2 directly transfers the packet 70 to the electronic device 4-3. The electronic device 4-3 also directly transfers the packet 70 to the electronic device 4-4 (YES in Step S54). When the initialization is completed (Step S52), the electronic device 4-4 directly transfers the packet 70 to the host apparatus 2.

As a result, the host apparatus 2 receives the packet 70 having CF=1 from the electronic device 4-4. Accordingly, the host apparatus 2 completes the initialization operation.

Second Example

A second example will be described below. In the second example, the group number CC of the first example is removed from the packet 70. That is, similarly to the first embodiment, the initialization may be performed in the order from the electronic device 4 located closer to the host apparatus 2. In this case, the processing in Step S56 in FIG. 22 is removed in the operation of the electronic device 4, and the operation associated with the group number CC in FIG. 23 is removed in the operation of the host apparatus 2.

For example, in FIG. 26, because of M=P in the electronic device 4-1, the electronic device 4-1 starts the initialization. The electronic device 4-1 updates initialization completion flag CF to 0 while updating the value of M to (M−P)=0. Because of M=0, the electronic devices 4-2 to 4-4 do not start the initialization.

Because the host apparatus 2 receives the packet 70 having CF=0 from the electronic device 4-4, the host apparatus 2 retransmits the packet 70. Therefore, because of M>P in the electronic device 4-2, the electronic device 4-2 starts the initialization. The electronic device 4-2 updates the value of CF to 0 while updating the value of M to (M−P)=2. Because of M>P in the electronic device 4-3 that receives the updated packet, the electronic device 4-3 starts the initialization. The electronic device 4-3 updates the value of M to (M−P)=0. Because of M<P in the electronic device 4-4, the initialization is not performed.

Then, when the host apparatus 2 issues the packet 70, because of M>P in the electronic device 4-4, the electronic device 4-4 starts the initialization. The electronic device 4-4 updates the value of CF to 0 while updating the value of M to (M−P)=2.

Then, when the host apparatus 2 issues the packet 70, the host apparatus 2 receives the packet 70 having CF=1 and the value of M identical to that in the transmission after the initialization is completed for all the electronic devices 4. Accordingly, the host apparatus 2 completes the initialization operation.

Thus, in the example in which the electronic devices 4-1 to 4-4 are sequentially initialized, because the packet 70 includes the initialization completion flag CF, the host apparatus 2 can recognize whether the initialization is completed by the packet 70. Obviously the initialization completion confirming command may be used irrespective of the initialization command.

Third Example

Figure 31:
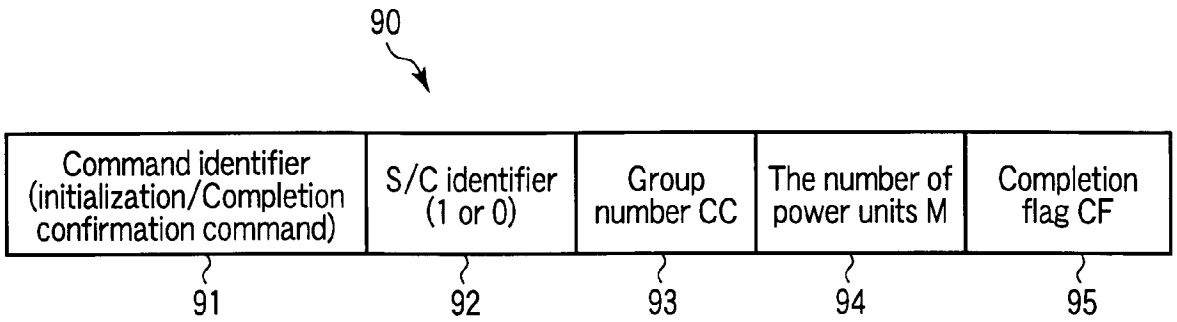
FIG. 31 is a conceptual view of the frame format of the second embodiment.

A third example will be described below. In the third example, a packet 90 illustrated in FIG. 31 is used in the first example. In the third example, the host apparatus 2 uses the packet 90 illustrated in FIG. 31 both in performing the initialization and in confirming the initialization completion.

The packet 90 includes a command identifier 91, an S/C identifier 92, and a group number 93. The command identifier 91 is shared by the initialization command and the initialization completion confirming command. The S/C identifier 92 has a value of "0" or "1". The S/C identifier 92 indicates the initialization when having the value of "0", and the S/C identifier 92 indicates the initialization completion confirmation when having the value of "1". That is, the electronic device 4 that receives the packet 90 can determine the packet 90 is the initialization command or the initialization completion confirming command by the value of the S/C identifier 92. The packet 90 can also be applied to the second example. In such cases, the group number CC can be removed.

Fourth Example

A fourth example will be described below. In the fourth example, instead of allocating the group number GN to each electronic device 4, the electronic devices 4 are classified into groups by the number of times in which the packet including the initialization command is received.

For example, in FIG. 23, the electronic devices 4-1 to 4-4 are configured to perform the initialization in receiving the packet including the initialization command at the first time, the electronic devices 4-5 to 4-8 are configured to perform the initialization in receiving the packet at the second time, the electronic devices 4-9 to 4-12 are configured to perform the initialization in receiving the packet at the third time, and the electronic devices 4-13 to 4-16 are configured to perform the initialization in receiving the packet at the fourth time. For example, this information is stored in the register 9. For example, the timing at which the information is stored in the register 9 may be Step S14 or Step S13, or the timing may exist during production.

The electronic device 4 that receives the packet including the initialization command increments the number of receiving times and retains the number of receiving times in the register 9. The processing unit 8 determines whether the incremented number of receiving times is matched with the number of receiving times stored in the register 9. When the incremented number of receiving times is matched with the number of receiving times stored in the register 9, the processing unit 8 performs the initialization and transmit the packet to the next electronic device 4. When the incremented number of receiving times is not matched with the number of receiving times stored in the register 9, the processing unit 8 transmits the packet to the next electronic device 4 without performing the initialization.

The operation associated with the group number CC in FIG. 23 is removed in the operation of the host apparatus 2.

In the example illustrated in FIG. 24 and FIG. 25, the electronic devices 4-1 to 4-4 are initialized when the host apparatus 2 initially transmits the packet including the initialization command. The electronic devices 4-5 to 4-8 are initialized when the host apparatus 2 transmits the packet at the second time. The electronic devices 4-9 to 4-12 are initialized when the host apparatus 2 transmits the packet at the third time. The electronic devices 4-13 to 4-15 are initialized when the host apparatus 2 transmits the packet at the fourth time. In such cases, the initialization completion confirming command is not required. However, the initialization completion confirming command may be used. In this case, the operation of the electronic device 4 is similar to that in FIG. 14.

According to the method, it is not necessary to include the group number in the packet including the initialization command and initialization completion confirming command In the example illustrated in FIG. 26 to FIG. 29, the electronic device 4-3 is initialized when the host apparatus 2 initially transmits the packet including the initialization command. The electronic device 4-1 is initialized when the host apparatus 2 transmits the packet at the second time. The electronic devices 4-2 and 4-4 are initialized when the host apparatus 2 transmits the packet at the third time (electronic devices 4-2 and 4-4 are allocated to the group having the number of receiving times (in other words, GN) of 2).

In the fourth example, the number of receiving times in each electronic device 4 is incremented every time the electronic device 4 receives the initialization command. Accordingly, it is necessary that the host system allocate the group to the electronic device 4 such that all the electronic devices 4 belonging to the groups can start the initialization in response to one initialization command. That is, it is necessary to perform the grouping in consideration of the number of power units P necessary to initialize the electronic devices 4. More specifically, the number of electronic devices 4 belonging to one group (the number of receiving times) is selected such that the total number of power units ΣP necessary to initialize all electronic devices 4 belonging to the group does not exceed the number of power units M that can be used by the host apparatus 2.

Effect

The processing in Step S14 of the first embodiment can be performed by the above-described method. The effect similar to that of the first embodiment is obtained in the second embodiment.

Third Embodiment

A semiconductor system and an electronic device initializing method according to a third embodiment will be described below. The third embodiment relates to an operation in performing re-initialization in the first and second embodiments. Because other configurations and operations are similar to those of the first and second embodiments, the description is omitted.

Figures 32, 33:
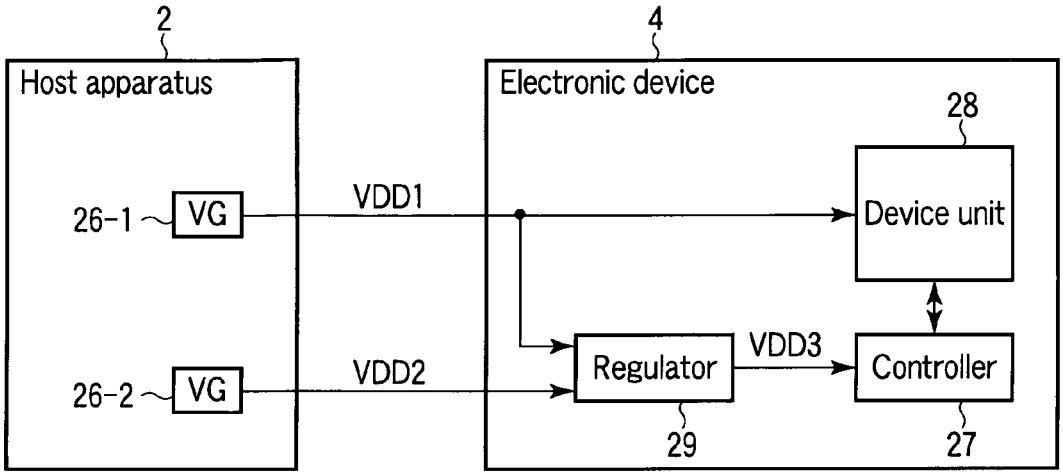
FIG. 32 is a block diagram of a semiconductor system according to a third embodiment.
FIG. 33 is a diagram illustrating a flag and an operation of a host apparatus of the third embodiment.

FIG. 32 is a block diagram illustrating a host apparatus 2 and one of electronic devices 4, and particularly illustrating a configuration relating to a power supply line. As illustrated in FIG. 32, the host apparatus 2 includes voltage generation circuits 26-1 and 26-2. The voltage generation circuit 26-1 generates a voltage VDD1, and the voltage generation circuit 26-2 generates a voltage VDD2. Where VDD1>VDD2 (or VDD1 and VDD2 may be substantially equal to each other or VDD1=VDD2). The voltages VDD1 and VDD2 are supplied as a power supply voltage to the electronic device 4.

The electronic device 4 is operated based on the voltages VDD1 and VDD2. The electronic device 4 roughly includes a controller 27, a device unit 28, and a regulator 29. The device unit 28 performs main functions (such as a memory function and a wireless LAN function) of the electronic device 4. The controller 27 has a function of performing interface processing with the host apparatus 2 and a function of controlling the device unit 28. For example, the controller 27 corresponds to the controller 30 illustrated in FIG. 6 of the first embodiment, and the device unit 28 corresponds to the NAND type flash memory 31 illustrated in FIG. 6. The regulator 29 regulates the voltages VDD1 and/or VDD2 to produce a voltage VDD3 (for example, 1.2 V) lower than the voltages VDD1 and VDD2.

The device unit 4 is operated with the voltage VDD1 as the power supply voltage. The controller 27 is operated with the voltage VDD3, produced by the regulator 29, as the power supply voltage. Particularly, in the controller 27, a circuit block that performs the interface processing with the host apparatus 2 is operated with the voltage VDD3 as the power supply voltage, and the voltage VDD3 is also provided as the power supply voltage to a register 9.

The register 9 includes an initialization flag. The initialization flag includes a flag VDD2ON and a flag DIDA. The initialization flag will be described in detail with reference to FIG. 33. FIG. 33 illustrates the initialization flag and an operation of the host apparatus 2 according to the initialization flag.

The flag VDD2ON indicates the state of the voltage VDD2. The flag VDD2ON="0" indicates the state immediately after the voltage VDD2 is powered on and the state in which the initialization is not completed for the electronic device 4. The flag VDD2ON="1" indicates the state in which the voltage VDD2 is powered on and maintained even after the initialization is completed for the electronic device 4. In other words, the flag VDD2ON is information indicating whether supply stop of the voltage VDD2 is occurred after the last initialization with respect to the electronic device 4.

The flag DIDA indicates whether the allocation of the device ID is required. The flag DIDA="0" indicates that the allocation of the device ID is required. Examples of the flag DIDA="0" includes the states in Steps S10 to S12 of FIG. 2 and the addition of the new electronic device 4. The flag DIDA="1" indicates that the allocation of the device ID is not required. For example, the flag DIDA="1" corresponds to the state the new electronic device 4 is not added in the processing from Step S13 of FIG. 2.

As described above, the power supply voltage of the register 9 is the voltage VDD3 that is obtained by regulating the voltage VDD2. Accordingly, the information in the register 9 is not deleted as long as the voltage VDD2 is supplied even if the supply of the voltage VDD1 is stopped. Specifically, the device ID in each electronic device 4, capability information, the operating condition set in Steps S16 and S17 of FIG. 2, and the initialization flag are maintained as long as the supply of the voltage VDD2 is stopped.

There are two kinds of re-initialization. That is, first re-initialization is recovery from a power-down mode, and second re-initialization is initialization performed to only one electronic device. The first initialization and the second initialization will be described in detail with reference to FIG. 2.

First Re-Initialization

The recovery from the power-down mode (dormant state) is performed in a procedure similar to that of the initialization. However, when the flag VDD2ON is checked to obtain the VDD2ON="1", only the processing in Step S10 in FIG. 2 is performed. Other pieces of processing in Steps S12 to S17 may be not performed.

Second Re-Initialization

The procedure of re-initializing only one electronic device is supported in the semiconductor system 1 of the third embodiment. In this case, not the broadcast command but the unicast command is used. When a specific electronic device is reset by a reset command, the electronic device returns to the state in which the allocation of the device ID is completed in Step S13 (Step S18 of FIG. 2). Only the specific electronic device 4 is initialized by a unicast initialization command Although the pieces of processing in Steps S14 to S17 are required in the case of VDD2ON="0", the performance may be omitted in the pieces of processing in Steps S14 to S17 because the register setting value is retained in the case of VDD2ON="1".

Effect

The effect similar to that of the first embodiment is obtained even in the configuration of the third embodiment. Additionally, the speed enhancement of the re-initialization operation can be achieved in the third embodiment.

In the third embodiment, the host apparatus 2 supplies the two kinds of the power supply voltages VDD1 and VDD2 to the electronic device 4. The reason for supplying the low-voltage power supply VDD2 is that the semiconductor system meets the speed enhancement of the operation. The high-voltage power supply VDD1 is used in the device unit 28 in the electronic device 4, and the low-voltage power supply VDD2 (the power supply VDD3 produced by regulating the power supply VDD2) is used in the communication between the controller 27 and the host apparatus 2. The information in the register 9 is not deleted as long as the low-voltage power supply VDD2 is supplied. Accordingly, in a period in which the electronic device 4 is not used, the supply of the high-voltage power supply VDD1 can be stopped to reduce the power consumption.

In the re-initialization, unless the supply of the low-voltage power supply VDD2 is stopped, the information in the register 9 can be used. Accordingly, the pieces of processing in Step S12 to S17 of FIG. 2 can be omitted. That is, it is not necessary to perform the re-initialization sequence, but the electronic device 4 can be returned to the usable state. Accordingly, the electronic device 4 can quickly recover from the power-down state.

Modification of Third Embodiment

In the third embodiment, the host apparatus 2 refers to the flag DIDA and the flag VDD2ON by way of example. However, it is not always necessary to provide the flag DIDA and the flag VDD2ON.

This is because whether the second power supply voltage VDD2 is shut down after the last initialization is the well-known information for the host apparatus 2. Therefore, the host apparatus 2 performs the initialization sequence of FIG. 2 again in case where the host apparatus 2 shut down the second power supply voltage VDD2 after the initialization, and the host apparatus 2 omits the initialization sequence of FIG. 2 when the host apparatus 2 did not shut down the second power supply voltage VDD2.

Alternatively, the host apparatus 2 may issue an initial command after recovering the first power supply voltage VDD1 and may detect response time-out. The time-out of the response means the state in which the electronic device 4 cannot be used yet, that is, the host apparatus 2 can determine that the second power supply voltage VDD2 is shut down in past time. At this point, the host apparatus 2 performs a power cycle to perform the re-initialization.

Beside the power supply condition, there is re-initialization processing associated with the reset command. The reset command is roughly classified into two kinds.

First, a command (CMD0) pursuant to the SD interface will be described. The command (CMD0) resets only an upper layer that processes the SD command. For example, for the UHS-II card, the layer is roughly divided into a physical layer, a link layer, and a transaction layer. The physical layer is an I/O cell unit based on the LVDS technology. The physical layer performs serial-parallel conversion of an LVDS signal to obtain a frequency that can be operated in the LSI. At this point, for example, 8B10B coding is used. The link layer performs processing in units of symbol (for example, 1 symbol is 2 bytes). That is, for example, the link layer is involved in encode and decode of the symbol, and symbol synchronization. The transaction layer performs packet-based transmission, and the transaction layer is involved in communication by a command-response described in the packet, transfer of the packetized data, and protocol-based management. An interval between SOP (Start of Packet) and EOP (End of Packet) is the packet.

When the command CMD0 is issued, only the transaction layer is initialized, and the physical layer and link layer, which are lower than the physical layer, are not initialized.

Another command is Full_Reset. According to the command Full_Reset, all the layers are initialized to put the electronic device 4 in the state immediately after the power-on. In this case, therefore, the initialization sequence is required. The command CMD0 is also issued during the initialization.

When only the command CMD0 is issued, it is not necessary to set the register (Steps S16 and S17B of FIG. 2) (the information in the register is not lost). On the other hand, when the command Full_Reset (including the command CMD0) is issued, it is necessary to reset the register.

Fourth Embodiment

A semiconductor system and an electronic device initializing method according to a fourth embodiment will be described below. The fourth embodiment relates to various connection methods of an electronic device 4 in the first to third embodiments. Hereinafter, the description of the same point as the first to third embodiments is omitted.

First Connection Example

Figure 34:
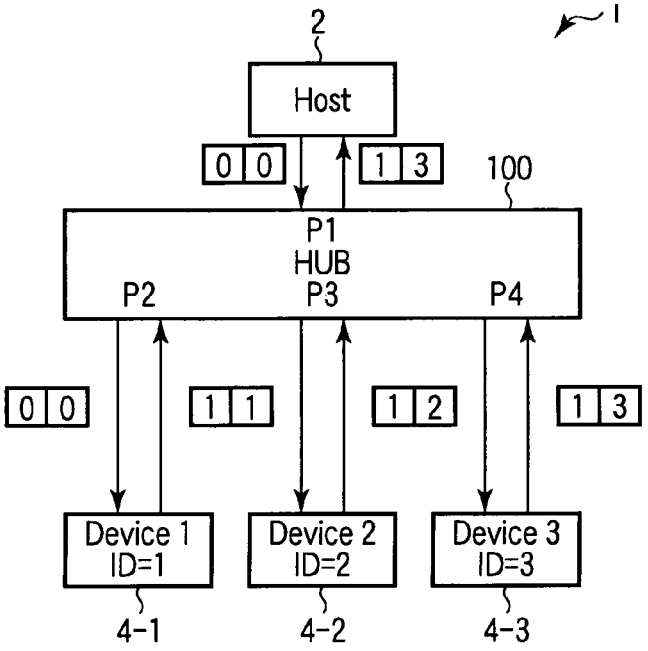
FIG. 34 and FIG. 35 are block diagrams of a semiconductor system according to a fourth embodiment.

In the first embodiment, as illustrated in FIG. 1, the electronic devices 4 are ring-connected by way of example. On the other hand, a hub may be used as illustrated in a first connection example of the fourth embodiment. FIG. 34 is a block diagram illustrating an example of a semiconductor system 1 according to the first connection example of the fourth embodiment.

As illustrated in FIG. 34, the semiconductor system 1 includes a host apparatus 2, electronic devices 4-1 to 4-3, and a hub 100. For example, the hub 100 includes four ports P1 to P4, and a packet is transferred in the order from ports P1 to P4. The host apparatus 2 is connected to the port P1 of the hub 100, and electronic devices 4-1 to 4-3 are connected to the ports P2 to P4, respectively. The configurations and operations of the host apparatus 2 and electronic devices 4 are described in the first to fourth embodiments. Similarly to the first embodiment of FIG. 11, square marks of FIG. 34 indicate a field 42-1 (start device ID) and a field 42-2 (the number of devices) of a payload for the purpose of a flow of the packet. Obviously the packet-flow illustrated in FIG. 34 is similarly applied to the processing of Step S14.

The flow of the packet transmitted by the host apparatus 2 will be described below. The packet is transmitted to the hub 100, and the hub 100 transfers the packet to the electronic device 4-1. The electronic device 4-1 returns the packet to the hub 100 after performing necessary processing. Then the hub 100 transfers the packet received from the electronic device 4-1 to the electronic device 4-2. The electronic device 4-2 returns the packet to the hub 100 after performing necessary processing. Then the hub 100 transfers the packet received from the electronic device 4-2 to the electronic device 4-3. The electronic device 4-3 returns the packet to the hub 100 after performing necessary processing. Finally the hub 100 returns the packet received from the electronic device 4-3 to the host apparatus 2.

Second Connection Example

Figure 35:
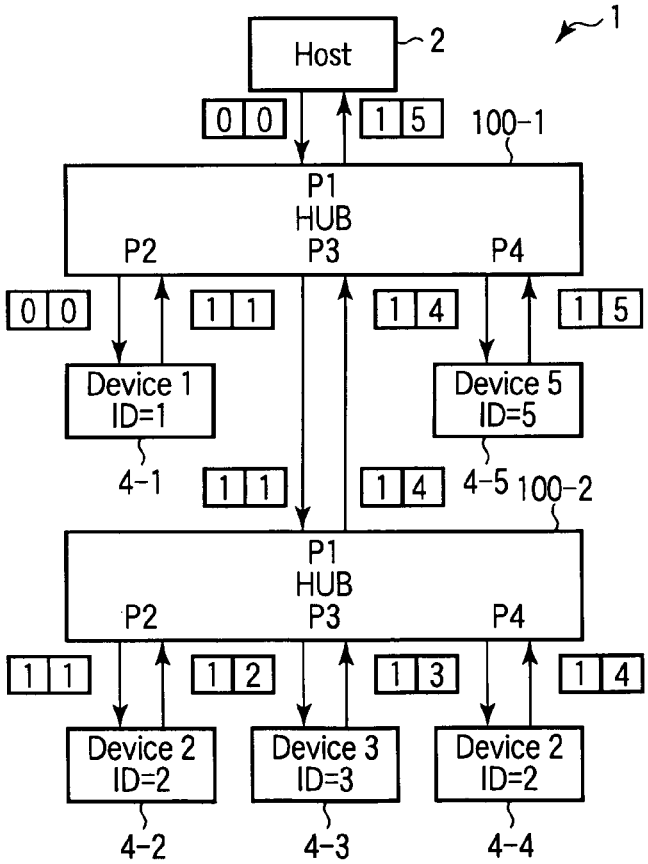

A second connection example will be described below with reference to FIG. 35. FIG. 35 is a block diagram of a semiconductor system 1 according to the second connection example of the fourth embodiment. The second connection example relates to a two-stage hub connection.

As illustrated in FIG. 35, the semiconductor system 1 includes a host apparatus 2, electronic devices 4-1 to 4-5, and hubs 100-1 and 100-2. For example, each of the hubs 100-1 and 100-2 includes four ports P1 to P4, and the packet is transferred in the order from ports P1 to P4. The host apparatus 2 is connected to the port P1 of the hub 100-1, and electronic devices 4-1 and 4-5 are connected to the ports P2 and P4, respectively, and the port P1 of the hub 100-2 is connected to the port P3. The electronic devices 4-2 to 4-4 are connected to the ports P2 to P4 of the hub 100-2, respectively. The configurations and operations of the host apparatus 2 and electronic device 4 are described in the first to third embodiments. Similarly to the first embodiment of FIG. 11, square marks of FIG. 35 indicate a field 42-1 (initial value of a device ID) and a field 42-2 (the number of devices) of a payload for the purpose of a flow of the packet. The packet-flow illustrated in FIG. 35 is similarly applied to the processing of Step S14.

The flow of the packet transmitted by the host apparatus 2 will be described below. The hub 100-1 receives the packet from the host apparatus 2, and the hub 100-1 transfers the packet to the electronic device 4-1. The electronic device 4-1 returns the packet to the hub 100-1. The hub 100-1 transmits the packet received from the electronic device 4-1 to the hub 100-2. The hub 100-2 transmits the packet received from the hub 100-1 to the electronic device 4-2. The electronic device 4-2 returns the packet to the hub 100-2. The hub 100-2 transmits the packet received from the electronic device 4-2 to the electronic device 4-3. The electronic device 4-3 returns the packet to the hub 100-2. Then the hub 100-2 transmits the packet received from the electronic device 4-3 to the electronic device 4-4. The electronic device 4-4 returns the packet to the hub 100-2. The hub 100-2 returns the packet received from the electronic device 4-4 to the hub 100-1. The hub 100-1 transmits the packet received from the hub 100-2 to the electronic device 4-5, and the electronic device 4-5 returns the packet to the hub 100-1. Finally the hub 100-1 returns the packet received from the electronic device 4-5 to the host apparatus 2.

Effect

As described above, the configurations of the first to third embodiments can be applied to not only the ring connection but also the hub connection, and the effect similar to that of the first to third embodiments is obtained in the fourth embodiment. The hub 100 originally has the function of transferring the packet to the electronic device 4 when the packet is broadcasted from the host apparatus 2. Accordingly, it is not necessary for the host apparatus 2 to understand the connection relationship among the plural electronic devices 4.

Fifth Embodiment

A semiconductor system and an electronic device initializing method according to a fifth embodiment will be described below. The fifth embodiment relates to specific examples of the first to fourth embodiments. Hereinafter, the description of the same point as the first to third embodiments is omitted.

Figure 36:
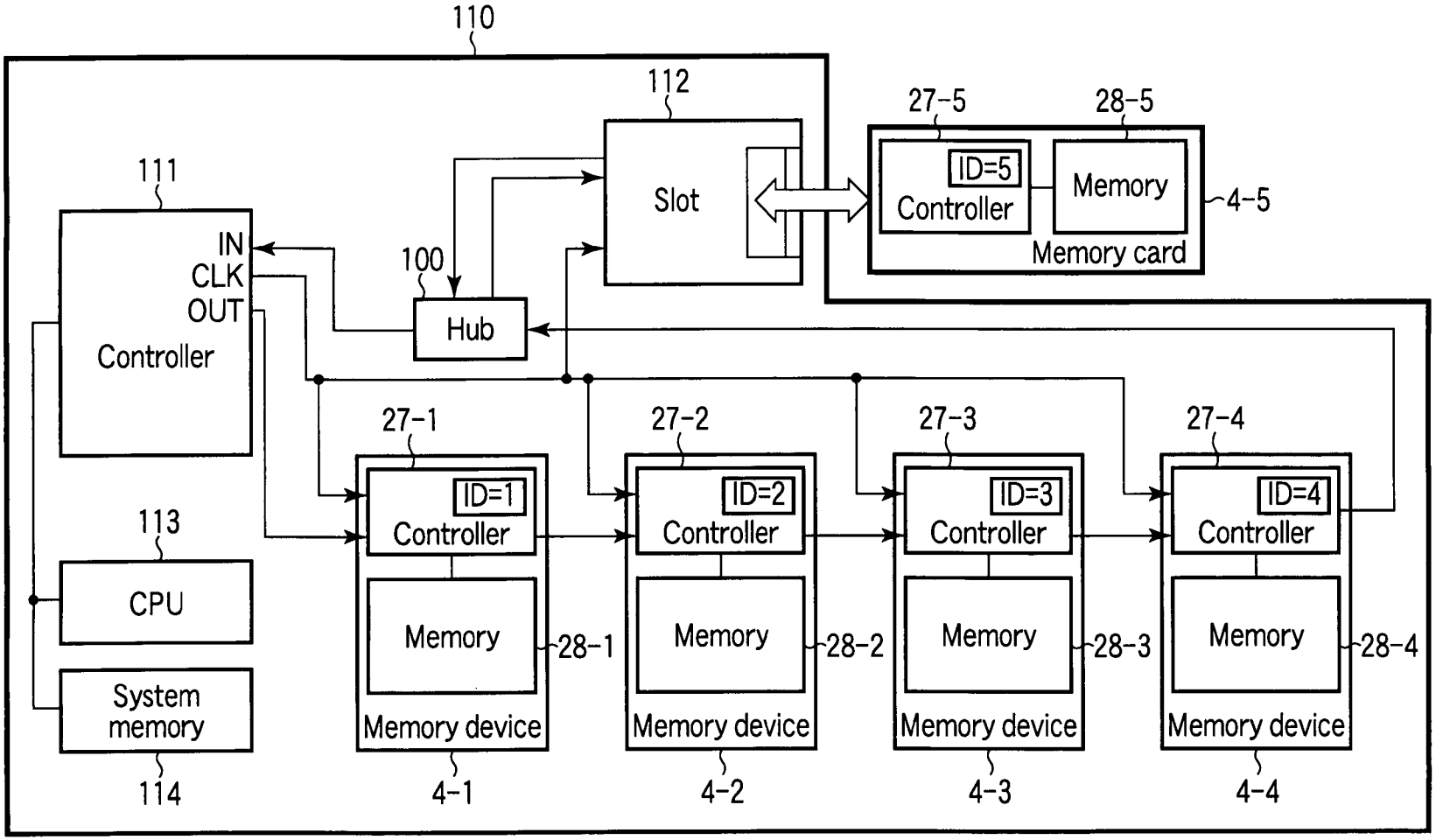
FIG. 36 is a block diagram of a semiconductor system according to a fifth embodiment.

FIG. 36 is a block diagram illustrating an example of a memory system according to the fifth embodiment. As illustrated in FIG. 36, a memory system 110 includes a host controller 111, a card slot 112, a CPU (central processing unit) 113, a system memory 114, electronic devices 4-1 to 4-4, and a hub 100.

The CPU 113 controls the whole operation of the memory system 110, and the CPU 113 is operated according to a program stored in a ROM (Read Only Memory, not illustrated). The system memory 114 is used in order that the CPU 113 temporarily stored various pieces of data in the system memory 114, and the system memory 114 is used to execute the executable program.

The host controller 111 corresponds to the host apparatus 2 of the first to fourth embodiments. The host controller 111 includes various pieces of hardware and software, various protocols, and the like, which are necessary to conduct communication with a device (element) possibly connected to the host controller 111. Specifically, the host controller 111 is configured to be able to communicate with the electronic devices 4 through a plurality of signal lines. Examples of the signal line include a signal line through which a packet is transferred, a signal line through which a clock is transferred, and a power supply line (VDD1 and VDD2, described previously). Part of the function of the host controller 111 outputs and captures the signals on the signal lines according to previously-set rules. More specifically, the host controller 111 analyzes the signal supplied through the signal line to recognize a previously-set bit pattern from the signal, and the host controller 111 captures a command from the signal. Similarly the host controller 111 recognizes a predetermined bit pattern to capture data from the signal. There are prepared various commands defined in the host controller 111. For example, the host controller 111 can be implemented by part of the function of the CPU, which is executed under the control of the software, or a semiconductor chip such the functions can be realized.

More specifically, the host controller 111 supports the signal lines D0 and D1 through which the packet is transferred and the signal line through which the clock RCLK are transferred. That is, the host controller 111 is configured to transfer the data using these signal lines. More specifically, the host controller 111 is configured to be able to control, for example, the SD interface.

The electronic devices 4-1 to 4-4 are incorporated in the memory system 110. Any type of device configured to be able to communicate with the CPU 113 through the host controller 111 can be used as the electronic devices 4-1 to 4-4. A memory device and a wireless LAN (Local Area Network) device can be cited as an example of the device. A main part of the device that can be used as the electronic devices 4-1 to 4-4 can be implemented by a well-known technology according to the function of each of the electronic devices 4-1 to 4-4. The electronic devices 4-1 to 4-4 can be implemented using the semiconductor chip sealed in a portable device such as the SD card.

The electronic devices 4-1 to 4-4 include device units 28-1 to 28-4 in order to perform main functions (such as a memory function and a wireless LAN function) of the electronic devices 4-1 to 4-4, respectively. The electronic devices 4-1 to 4-4 also include controllers (device controller) 27-1 to 27-4, respectively. Each of the controllers 27-1 to 27-4 is configured to be able to communicate with the CPU 113 through the host controller 111 using an interface. That is, each of the controllers 27-1 to 27-4 includes hardware and software configurations in order to support the interface.

When the host controller 111 supports the SD interface, the controllers 27-1 to 27-4 are configured to support the SD interface as well. The controllers 27-1 to 27-4 may be implemented as the CPU and/or the semiconductor chip, which is independent of the device units 28-1 to 28-4. Alternatively, a semiconductor chip in which the controller 27-1 to 27-4 and the device units 28-1 to 28-4 are integrated may be implemented.

Similarly to the first to fourth embodiments, each of the controllers 27-1 to 27-4 includes an input signal pin 5, an output signal pin 6, a packet decoder 7, a processing unit 8, a register 9, and a packet update circuit 10.

The electronic devices 4-1 and 4-2 are memory devices. The electronic devices 4-1 and 4-2 include the NAND type flash memories as device units 28-1 and 28-2. The NAND type flash memory includes a plurality of pages as a storage region. Each page includes a plurality of memory cell transistors connected in series. Each memory cell transistor is formed by a so-called stacked gate structure type MOS transistor. The stacked gate structure type MOS transistor includes a gate electrode and a source/drain diffusion layer. A tunnel insulator, a charge accumulation layer (such as floating gate electrode), an inter-electrode insulator, and a control gate electrode are sequentially stacked in the gate electrode. In each memory cell transistor, a threshold voltage changes according to the number of electrons accumulated in the charge accumulation layer, and pieces of information are stored according to a difference of the threshold voltage. A control circuit includes a memory sense amplifier and a potential generating circuit. The control circuit has a configuration in which multi-bit data can be written in and read from the memory cell transistor. The data write and read are performed units of pages. Data deletion is performed in units of blocks each of which includes a plurality of pages.

For example, the electronic devices 4-3 and 4-4 are SD IO devices, and the electronic devices 4-3 and 4-4 have the wireless LAN functions as the device units 28-3 and 28-4.

A removable card type electronic device 4-5 (hereinafter referred to as a card device 4-5) can be inserted in and pulled out from the card slot 112. The card device 4-5 includes a memory system and other devices that are supported by the card slot 112.

The card slot 112 includes terminals to be connected to the card device 4-5, and lines in the interface are connected to the corresponding terminals. When the host controller 21 supports the SD interface, terminals necessary for the SD interface are provided in the card slot 112.

The card device 4-5 includes all the card devices, which can communicates with the host controller 111 through the SD interface, such as the SD memory card and the SDIO card. In the example of FIG. 36, the card device 4-5 is the SD memory card. Similarly to the electronic devices 4-1 to 4-4, the card device 4-5 includes a controller 27-5 and a device unit 28-5.

Similarly to the first to fourth embodiments, the controller 27-5 includes the input signal pin 5, the output signal pin 6, the packet decoder 7, the processing unit 8, the register 9, and the packet update circuit 10. The device unit 28-5 includes the NAND type flash memory. The configuration of the device unit 28-5 is similar to that of the device units 28-1 and 28-2.

In the semiconductor system 110 having the above-described configuration, the electronic device 4-1 receives the packet transmitted from the host controller 111, the electronic device 4-1 transfers the packet to the electronic device 4-2, the electronic device 4-2 transfers the packet to the electronic device 4-3, the electronic device 4-3 transfers the packet to the electronic device 4-4, and the electronic device 4-4 transfers the packet to the hub 100.

The hub 100 transfers the packet transferred from the electronic device 4-4 to the card slot 112 if needed, thereby providing the packet to the card device 4-5 inserted in the card slot 112. The packet output from the output signal pin 6 of the card device 4-5 and/or the packet output from the output signal pin 6 of the electronic device 4-4 are returned to the host controller 111 through the hub 100.

The first to fourth embodiments can be applied to the configuration of the fifth embodiment.

Sixth Embodiment

A semiconductor system and an electronic device initializing method according to a sixth embodiment will be described below. In the sixth embodiment, the first to fifth embodiments are applied to a semiconductor system including single electronic device.

Figures 37, 38:
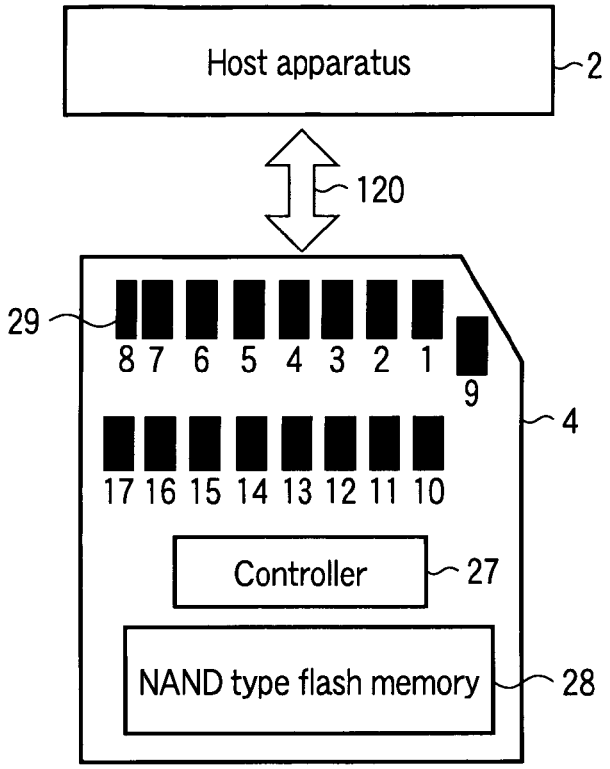
FIG. 37 is a block diagram of a semiconductor system according to a sixth embodiment.
FIG. 38 is a diagram illustrating allocation of signals to signal pins of an electronic device of the sixth embodiment.

FIG. 37 is a block diagram of a semiconductor system 1 according to the sixth embodiment. As illustrated in FIG. 37, the semiconductor system 1 includes one electronic device 4. The electronic device 4 is the SD memory card.

Information is transmitted and received between the memory card 4 and a host apparatus 2 through a bus interface 120. The memory card 4 includes a NAND flash memory chip (sometimes simply referred to as a NAND flash memory or a flash memory) 28, a memory controller 27 that controls the NAND flash memory chip 28, and a plurality of signal pins (first pin to seventeenth pin) 29.

The plurality of signal pins 29 are electrically connected to the memory controller 27. FIG. 38 illustrates an example of allocation of signals to the first pin to seventeenth pin in the plurality of signal pins 29. FIG. 38 is a table illustrating the first pin to seventeenth pin and the signals allocated to the first pin to the seventeenth pin.

The seventh pin, eighth pin, ninth pin, and first pin are allocated to data 0 to data 3, respectively. The first pin is also allocated to a card detection signal. The second pin is allocated to a command CMD, the third pin and the sixth pin are allocated to a ground potential GND, the fourth pin is allocated to the power supply voltage VDD1 described above, and the fifth pin is allocated to the clock signal RCLK.

The tenth pin, thirteenth pin, fourteenth pin, and seventeenth pin are allocated to the power supply voltage VDD2 described above or ground potential GND. The eleventh pin, twelfth pin, fifteenth pin, and sixteenth pin are allocated to the data (D1+), data (D1−), the data (D0−), and data (D0+). The data (D1+) and data (D1−), and the data (D0−) and data (D0+) are pairs of the differential signals described above, respectively. As described above, the signal pair D0+ and D0− is used for the signal transmission from the host apparatus 2 to the electronic device 4. The signal pair D1+ and D1− is used for the signal transmission from the electronic device 4 to the host apparatus 2.

The memory card 4 is formed so as to be able to be inserted in and pulled out from the slot provided in the host apparatus 2. A host controller (not illustrated) which is provided in the host apparatus 2 transmits and receives various signals and data to and from the memory controller 27 in the electronic device 4 through the first pin to seventeenth pin. For example, when the data is written in the memory card 4, the host controller transmits a write command as a serial signal to the memory controller 27 through the eleventh and twelfth pins. At this point, the memory controller 27 captures the write command provided to the eleventh and twelfth pins in response to the clock RCLK supplied to the seventh and eighth pins.

The write command is serially input to the memory controller 27 using only the eleventh and twelfth pins. The eleventh and twelfth pins allocated to the command input are disposed as illustrated in FIG. 38. The plurality of signal pins 29 and the bus interface 120 associated with the pins 29 are used in order that the host controller in the host apparatus 2 and the memory card 4 communicate with each other.

On the other hand, the communication between the NAND type flash memory 28 and the memory controller 27 is conducted by a NAND flash memory interface. Accordingly, although not illustrated here, the NAND flash memory 28 and the memory controller 27 are connected by, for example, an 8-bit input and output (I/O) line.

In the above configuration, the memory controller 27 corresponds to the controllers 27 and 30 of the first to fifth embodiments, and the NAND flash memory 28 corresponds to the device units 28 and 31 of the first to fifth embodiments. The operations of the first to third embodiments can be performed by the configuration of the sixth embodiment. The sixth embodiment corresponds to the case of L=1 and N=1 in FIG. 2.

Modifications

As described above, according to the semiconductor system 1 and the method for initializing the electronic device 4 of the first to sixth embodiments, the plurality of electronic devices 4 and the host apparatus 2 which simultaneously initializes the electronic devices 4 in units of group are included. Therefore, the initialization speed of the electronic device 4 can be enhanced. Note that it is not always necessary that the word "simultaneously" mean "simultaneously" in terms of time, but the word "simultaneously" means that, for example, the plurality of electronic devices 4 are initialized by one packet issued by the host apparatus. For example, in FIG. 15, the electronic devices 4-1 to 4-4 are collectively initialized by the one-time issuance of the packet 52. However, obviously the temporally simultaneous initialization may be included.

That is, the electronic device 4 starts the initialization with the reception of the packet as a trigger. At this point, the electronic device 4 that receives the packet to start the initialization transmits the packet to the next electronic device 4 without waiting for the initialization completion.

Accordingly, in the initialization start timing, although a delay is generated among the electronic devices 4, the period during which the plurality of electronic devices 4 simultaneously perform the initialization exists when the time necessary for the initialization is longer than the packet transmission time.

As described above, when receiving the packet during the initialization, the electronic device 4 waits for the initialization completion, and the electronic device 4 transmits the packet to the next electronic device after the completion. Accordingly, it is necessary that the host apparatus wait for the packet for a finite period of time until the packet returns to the host apparatus. However, the initialization has been already started by the last packet, plurality of electronic devices 4 simultaneously perform the initialization, and there is a restriction (maximum time) to the time necessary for the initialization of each electronic device 4. Therefore, even if the number of electronic devices 4 is increased, the host apparatus does not wait for the packet for a long time. When the host apparatus receives the packet, the initialization is completed for all the electronic devices 4.

The semiconductor system 1 includes the plurality of electronic devices 4 and the host apparatus 2. The host apparatus 2 supplies the first power supply voltage VDD1 and the second power supply voltage VDD2 lower than the first power supply voltage VDD1 to the electronic devices 4, and the host apparatus 2 can initialize the electronic devices 4. Each of the electronic devices 4 includes the device unit 28 and the controller unit 27. The device unit 28 operates using the first power supply voltage VDD1. The controller unit 27 operates using the second power supply voltage VDD2, and the controller unit 27 performs the interface processing with the host apparatus 2. The controller unit 27 includes the register 9 which retains the operating condition information between the host apparatus 2 and the electronic devices 4. The operating condition information in the register 9 is retained in the period in which the second power supply voltage VDD2 is supplied, even if the first power supply voltage VDD1 is shut down.

In the first embodiment, both the signals D0+ and D0− have the "L" level when the semiconductor system 1 is in the dormant state. Alternatively, the signals D0+ and D0− may have the "H" level. Even in the case, the signal D0+ or D0− may change to the "L" level by the transmission of the symbol STB, thereby detecting that the signal D0 changes to the differential level. The same holds true for the signal D1.

In addition to the SD memory card, the embodiments can be applied to devices such as a UHS (Ultra High Speed)-II card which transfer the data at high speed. When the electronic device 4 is the memory device, the memory structure of the electronic device 4 is not limited to the NAND flash memory, but memory structures of a NOR flash memory and a semiconductor memory except the flash memory may be used as the memory structure of the electronic device 4.

In the embodiments, the operations are described with reference to various flowcharts. However, each flowchart is described only by way of example. The steps may be interchanged as much as possible, the plurality of steps may simultaneously be performed, and some steps may possibly be omitted.

For example, in FIG. 2, the transfer of the boot code (Step S12) and the allocation of the device ID (Step S13) can be interchanged. For example, when the boot code is transferred immediately after the host apparatus 2 powers on the semiconductor device 3, the processing in Step S12 can be performed before the processing in Step S13 as illustrated in FIG. 2. Alternatively, the electronic device 4 may make a request to issue the read command to the host apparatus 2. That is, the electronic device 4 that retains the boot code makes a request to read the boot code to the host apparatus 2 immediately after the power-on. The host apparatus 2 reads the boot code from the electronic device 4 in response to the request. Thus, the processing in Step S13 is performed before the processing in Step S12 when the read command is issued from the side of the electronic device 4.

The flowchart can be performed by hardware, software, or a combination thereof. When the flowchart is performed by software, a program corresponding to the flowchart is stored in the ROM, and the processor such as the CPU executes the program to perform the operation described in the flowchart.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

[1. A semiconductor system comprising:

a host apparatus programmed to initialize a plurality of electronic devices in units of a group using one packet, wherein the host apparatus is further programmed to transmit a packet for initialization of the electronic devices, the packet including a first group number and a first number of power units available for the initialization, wherein each of the electronic devices includes a processor and a register, the register storing a second group number and a second number of power units, the second number of power units being a number of required power units during initialization of each of the electronic devices, the plurality of electronic devices sequentially receiving the packet, wherein for each of the plurality of electronic devices, the processor is programmed to determine that the first group number is matched with the second group number, and the first number of power units is not lower than the second number of power units, and based on that determination the processor which has not been initialized performs the initialization, the processor updates the first number of power units to a differential value obtained when the second number of power units is subtracted from the first number of power units, and the processor transmits the packet to a next electronic device, and wherein the processor is programmed to determine that an electronic device has been already initialized, and based on that determination the processor transmits the packet to the next electronic device without performing the initialization.]

[2. The system according to claim 1, wherein the processor is programmed to determine that the electronic device is currently being initialized, and based on that determination the processor transmits the packet to the next electronic device after waiting for initialization completion.]

[3. The system according to claim 1, wherein the packet further includes an initialization completion flag, and the processor is programmed to determine that the electronic device has not been initialized or is not currently being initialized, and based on that determination the processor updates the initialization completion flag to information indicating that the initialization is not completed yet and the processor transmits the packet to the next electronic device.]

[4. The system according to claim 3, wherein the host apparatus is programmed to set the initialization completion flag as an initial value and transmit the packet to a first electronic device, in receiving the packet whose initialization completion flag indicates that the initialization is completed, the host apparatus determines that the initialization is completed for all the electronic devices, and in returning the packet whose initialization completion flag indicates that the initialization is not completed, the host apparatus determines that there is at least an electronic device that has not completed the initialization.]

[5. The system according to claim 3, wherein when the host apparatus determines that the initialization completion flag indicates that the initialization is not completed, the host apparatus is programmed to retransmit the packet without updating the first group number, when receiving, from an electronic device, the packet including the first number of power units different from that in transmission, and the host apparatus updates the first group number to retransmit the packet, when receiving, from an electronic device, the packet including the first number of power units identical to that in the transmission.]

[6. A semiconductor device comprising:

a first electronic device including a first processor and a first register; and a second electronic device including a second processor and a second register;

wherein the first electronic device receives a packet transmitted from a host apparatus, the packet including a first group number and a first number of power units available for initialization; and the second electronic device receives the packet from the first electronic device, the first processor is programmed to initialize the first electronic device with the packet, the second processor is programmed to initialize the second electronic device with the packet, each of the first and second registers stores a second group number and a second number of power units, in a case the first electronic device which has not been initialized receives the packet, the first processor is programmed to determine that the first group number is matched with the second group number, and the first number of power units is not lower than the second number of power units required for the initialization of the first electronic device, and based on that determination the first processor performs the initialization of the first electronic device, the first processor updates the first number of power units to a differential value obtained when the second number of power units is subtracted from the first number of power units, and the first processor transmits the packet to the second electronic device, and in a case the first electronic device which is initializing receives the packet, the first processor is programmed to wait until end of initialization and then transmits the packet without performing the initialization to the second electronic device, and in a case the first electronic device which has been already initialized receives the packet, the first processor is programmed to immediately transmit the packet without performing the initialization to the second electronic device.]

[7. The device according to claim 6, wherein the first processor is programmed to transmit the packet after the initialization completion when receiving the packet during initialization.]

[8. A method for initializing an electronic device, comprising:

receiving, by the electronic device, a transmitted packet from a host apparatus, the packet including a first group number and a first number of power units available for the initialization;

transferring the packet sequentially among a plurality of electronic devices, a second group number being set to each of the electronic devices, a second number of power units being required for initialization of each of the electronic devices; and performing the initialization for an electronic device which has not been initialized, updating the first number of power units to a differential value obtained when the second number of power units is subtracted from the first number of power units, and transmitting the packet to a next electronic device, when the first group number is matched with the second group number of the electronic device, and the first number of power units is not lower than the second number of power units for the electronic device;

waiting until completion of the initialization and transmitting the packet to the next electronic device without performing the initialization by an electronic device which is initializing; and transmitting the packet immediately to the next electronic device without performing the initialization by an electronic device which has been already initialized.]

[9. The method according to claim 8, wherein the electronic device which is currently being initialized transmits the packet to the next electronic device after waiting for initialization completion.]

*10. A host apparatus connectable to a plurality of electronic devices,*

*the host apparatus including:*

*a first port transmitting a packet including a command and data for initialization of the plurality of electronic devices in units of a group, wherein the packet includes a first group number and a first number of power units available for the initialization; and*

*a second port receiving the packet from one of the electronic devices,*

*wherein a second group number and a second number of power units are stored in each of the electronic devices, the second number of power units is a number of required power units during initialization of each of the electronic devices, and the packet is sequentially transferred to the plurality of electronic devices,*

*wherein in the packet received at the second port, the first number of power units is updated to a differential value obtained by subtracting at least one second number of power units from the first number of power units.*

*11. The host apparatus according to claim 10, wherein the packet further includes an initialization completion flag.*

*12. The host apparatus according to claim 11, wherein in the packet transmitted from the first port, the initialization completion flag is set to an initial value,*

*when the second port receives the packet whose initialization completion flag indicates that the initialization is completed, the host apparatus determines that the initialization is completed for all the electronic devices, and*

*when the second port receives the packet whose initialization completion flag indicates that the initialization is not completed, the host apparatus determines that there is at least one electronic device that has not completed the initialization.*

*13. The host apparatus according to claim 11, wherein the second port receives the packet whose the initialization completion flag indicates that the initialization is not completed,*

*the host apparatus retransmits the packet without updating the first group number, when the first number of power units in the received packet differs from that in transmission, and*

*the host apparatus updates the first group number and retransmits the packet, when the first number of power units in the received packet is identical to that in the transmission.*

* * * * *